(12) United States Patent
Watanabe et al.

(10) Patent No.: US 12,463,404 B2
(45) Date of Patent: Nov. 4, 2025

(54) VERTICAL CAVITY SURFACE EMITTING LASER ELEMENT, VERTICAL CAVITY SURFACE EMITTING LASER ELEMENT ARRAY, VERTICAL CAVITY SURFACE EMITTING LASER MODULE, AND METHOD OF PRODUCING VERTICAL CAVITY SURFACE EMITTING LASER ELEMENT

(71) Applicant: SONY GROUP CORPORATION, Tokyo (JP)

(72) Inventors: Tomomasa Watanabe, Tokyo (JP); Hiroshi Nakajima, Tokyo (JP); Mikihiro Yokozeki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 706 days.

(21) Appl. No.: 17/756,999

(22) PCT Filed: Dec. 8, 2020

(86) PCT No.: PCT/JP2020/045571
§ 371 (c)(1),
(2) Date: Jun. 7, 2022

(87) PCT Pub. No.: WO2021/124968
PCT Pub. Date: Jun. 24, 2021

(65) Prior Publication Data
US 2023/0008483 A1 Jan. 12, 2023

(30) Foreign Application Priority Data
Dec. 20, 2019 (JP) .................. 2019-230750

(51) Int. Cl.
*H01S 5/00* (2006.01)
*H01S 5/02* (2006.01)
(Continued)

(52) U.S. Cl.
CPC ............ *H01S 5/423* (2013.01); *H01S 5/0215* (2013.01); *H01S 5/02253* (2021.01);
(Continued)

(58) Field of Classification Search
CPC .... H01S 5/423; H01S 5/0215; H01S 5/02253; H01S 5/18305; H01S 5/18311;
(Continued)

(56) References Cited

U.S. PATENT DOCUMENTS 6,046,065 A * 4/2000 Goldstein ........... H01S 5/18377
438/46
7,330,495 B2 * 2/2008 Takahashi ............... H01S 5/187
438/22
(Continued)

FOREIGN PATENT DOCUMENTS

CN 110268587 A 9/2019
CN 110892596 A 3/2020
(Continued)

OTHER PUBLICATIONS

International Search Report and Written Opinion of PCT Application No. PCT/JP2020/045571, issued on Mar. 9, 2021, 13 pages of ISRWO.

*Primary Examiner* — Kinam Park
(74) *Attorney, Agent, or Firm* — CHIP LAW GROUP

(57) ABSTRACT

Provided is a vertical cavity surface emitting laser element that includes a first substrate, a second substrate, a first DBR layer, and a second DBR layer. The first substrate is formed of a first material and includes an active layer. The second substrate is formed of a second material and is bonded to the first substrate, the second material causing light having a specific wavelength to be transmitted therethrough and being different from that of the first substrate. The first DBR layer is provided on a side of the first substrate opposite to (Continued)

the second substrate and reflects the light having the wavelength. The second DBR layer is provided on a side of the second substrate opposite to the first substrate and reflects the light having the wavelength.

18 Claims, 11 Drawing Sheets

(51) Int. Cl.
  *H01S 5/02253* (2021.01)
  *H01S 5/183* (2006.01)
  *H01S 5/30* (2006.01)
  *H01S 5/42* (2006.01)
  *H01S 5/042* (2006.01)

(52) U.S. Cl.
  CPC ...... *H01S 5/18305* (2013.01); *H01S 5/18311* (2013.01); *H01S 5/18377* (2013.01); *H01S 5/1838* (2013.01); *H01S 5/3095* (2013.01); *H01S 5/04257* (2019.08); *H01S 5/18369* (2013.01); *H01S 5/18388* (2013.01)

(58) Field of Classification Search
  CPC .. H01S 5/18377; H01S 5/1838; H01S 5/3095; H01S 5/04257; H01S 5/18369; H01S 5/18388
  See application file for complete search history.

(56) References Cited

U.S. PATENT DOCUMENTS

| | | | |
|---|---|---|---|
| 2002/0101894 A1* | 8/2002 | Coldren | H01S 5/18316 216/11 |
| 2002/0173089 A1* | 11/2002 | Zhu | H01S 5/18305 438/200 |
| 2015/0179840 A1* | 6/2015 | Watanabe | H10F 77/251 257/459 |
| 2016/0043529 A1 | 2/2016 | Koyama et al. | |
| 2019/0334318 A1 | 10/2019 | Hamaguchi et al. | |
| 2020/0028325 A1 | 1/2020 | Mitomo et al. | |
| 2020/0161833 A1* | 5/2020 | Weichmann | H01S 5/0428 |

FOREIGN PATENT DOCUMENTS

| | | |
|---|---|---|
| DE | 102015112981 A1 | 2/2016 |
| DE | 112017005952 T5 | 8/2019 |
| EP | 00829934 A1 | 3/1998 |
| EP | 3419123 A1 | 12/2018 |
| EP | 3611811 A1 | 2/2020 |
| FR | 2753577 A1 | 3/1998 |
| JP | 10-107389 A | 4/1998 |
| JP | 2004-140007 A | 5/2004 |
| JP | 2005-159071 A | 6/2005 |
| JP | 2009-094317 A | 4/2009 |
| JP | 2016-039274 A | 3/2016 |
| JP | 2020-524910 A | 8/2020 |
| KR | 10-2016-0018396 A | 2/2016 |
| KR | 10-2020-0024845 A | 3/2020 |
| WO | 2018/096850 A1 | 5/2018 |
| WO | 2018/190030 A1 | 10/2018 |
| WO | 2018/234131 A1 | 12/2018 |

\* cited by examiner

//VERTICAL CAVITY SURFACE EMITTING LASER ELEMENT, VERTICAL CAVITY SURFACE EMITTING LASER ELEMENT ARRAY, VERTICAL CAVITY SURFACE EMITTING LASER MODULE, AND METHOD OF PRODUCING VERTICAL CAVITY SURFACE EMITTING LASER ELEMENT

CROSS REFERENCE TO RELATED APPLICATIONS

This application is a U.S. National Phase of International Patent Application No. PCT/JP2020/045571 filed on Dec. 8, 2020, which claims priority benefit of Japanese Patent Application No. JP 2019-230750 filed in the Japan Patent Office on Dec. 20, 2019. Each of the above-referenced applications is hereby incorporated herein by reference in its entirety.

TECHNICAL FIELD

The present technology relates to a vertical cavity surface emitting laser element including a pair of DBRs, a vertical cavity surface emitting laser element array, a vertical cavity surface emitting laser module, and a method of producing a vertical cavity surface emitting laser element.

Background Art

A vertical cavity surface emitting laser (VCSEL) element has a structure in which an active layer in which light emission is generated is sandwiched between a pair of distributed Bragg reflectors (DBRs). The DBR is a laminate of a plurality of layers obtained by alternately laminating a low-refractive index layer and a high-refractive index layer, and reflects light having a predetermined wavelength to cause laser oscillation.

Here, in a VCSEL element having a long wavelength band, which includes an active layer formed of an InP material, there is no material that can be lattice-matched with InP and has a sufficient refractive index difference, and it is difficult to configure a semiconductor DBR having high light reflectance and high thermal conductivity on an InP substrate. For this reason, a technology for forming a semiconductor DBR on a substrate such as a GaAs substrate, which is different from an InP substrate, and performing wafer bonding to the InP substrate has been developed (see, for example, Patent Literature 1).

Meanwhile, a non-conductive DBR can be prepared using a dielectric material ($SiO_2$, $Ta_2O_5$, $Al_2O_3$, a-Si, $TiO_2$, and the like) that easily causes a refractive index difference by a relatively inexpensive production method. For this reason, also InP VCSELs including a dielectric DBR using these dielectric materials have been put to practical use.

CITATION LIST

Patent Literature

Patent Literature 1: Japanese Patent Application Laid-open No. 2005-159071

DISCLOSURE OF INVENTION

Technical Problem

However, in the configuration in Patent Literature 1, since the semiconductor DBR is provided on the active layer side, there has been a problem that the thermal resistance is high and the boding interface becomes highly resistant. Further, also in the case of using a dielectric DBR, there has been a problem in heat dissipation because the dielectric DBR has low thermal conductivity.

In view of the circumstances as described above, it is an object of the present technology to provide a vertical cavity surface emitting laser element that has low thermal resistance and is capable of operating at high temperature, a vertical cavity surface emitting laser element array, a vertical cavity surface emitting laser module, and a method of producing a vertical cavity surface emitting laser element.

Solution to Problem

In order to achieve the above-mentioned object, a vertical cavity surface emitting laser element according to an embodiment of the present technology includes: a first substrate; a second substrate; a first DBR layer; and a second DBR layer.

The first substrate is formed of a first material and includes an active layer.

The second substrate is formed of a second material and is bonded to the first substrate, the second material causing light having a specific wavelength to be transmitted therethrough and being different from that of the first substrate.

The first DBR layer is provided on a side of the first substrate opposite to the second substrate and reflects the light having the wavelength.

The second DBR layer is provided on a side of the second substrate opposite to the first substrate and reflects the light having the wavelength.

With this configuration, the first substrate including the active layer and the second substrate are provided between the first DBR layer and the second DBR layer. For this reason, the heat generated in the active layer is dissipated through the second substrate located in the vicinity, and a VCSEL element having low thermal resistance can be realized. In particular, even in the case where the first substrate is formed of a material having low thermal conductivity, heat dissipation can be achieved by bonding the second substrate formed of a material different from that of the first substrate.

The second material may be a material having thermal conductivity higher than that of the first material.

The first material may be InP and the second material may be Si, SiC, AlN, or GaN.

The first substrate may include the active layer formed by crystal growth on a base material formed of InP.

The first material may be GaAs and the second material may be Si, SiC, AlN, or GaN.

The first substrate may include the active layer formed by crystal growth on a base material formed of GaAs.

The vertical cavity surface emitting laser element may have a current constriction structure by a tunnel junction.

The vertical cavity surface emitting laser element may have a light constriction structure by the tunnel junction.

The vertical cavity surface emitting laser element may have a current constriction structure by oxidation treatment.

The vertical cavity surface emitting laser element may have a current constriction structure by ion implantation.

The vertical cavity surface emitting laser element may have a lens structure that is formed by a projecting portion provided on the second substrate and the second DBR layer provided on the projecting portion and collects incident light on a region of the active layer between the first DBR layer and the second DBR layer.

The vertical cavity surface emitting laser element may further include a third substrate that is formed of a third material and is bonded a side of the first substrate opposite to the second substrate, the third material causing light having the wavelength to be transmitted therethrough and being different from that of the first substate, in which
the first DBR layer may be provided on a side of the third substrate opposite to the first substrate.
The first DBR layer may be a semiconductor DBR or a dielectric DBR, and
the second DBR layer may be a semiconductor DBR or a dielectric DBR.

The vertical cavity surface emitting laser element may emit a laser beam from a side of the second DBR layer.

The vertical cavity surface emitting laser element may emit a laser beam from a side of the first DBR layer.

In order to achieve the above-mentioned object, a vertical cavity surface emitting laser element array according to an embodiment of the present technology includes: a plurality of arranged vertical cavity surface emitting laser elements.

The vertical cavity surface emitting laser element includes: a plurality of arrange vertical cavity surface emitting laser elements each including a first substrate that is formed of a first material and includes an active layer, a second substrate that is formed of a second material and is bonded to the first substrate, the second material causing light having a specific wavelength to be transmitted therethrough and being different from that of the first substrate, a first distributed Bragg reflector (DBR) layer that is provided on a side of the first substrate opposite to the second substrate and reflects the light having the wavelength, and a second DBR layer that is provided on a side of the second substrate opposite to the first substrate and reflects the light having the wavelength.

In order to achieve the above-mentioned object, a vertical cavity surface emitting laser module according to an embodiment of the present technology includes: a vertical cavity surface emitting laser element.

The vertical cavity surface emitting laser element includes a first substrate that is formed of a first material and includes an active layer, a second substrate that is formed of a second material and is bonded to the first substrate, the second material causing light having a specific wavelength to be transmitted therethrough and being different from that of the first substrate, a first distributed Bragg reflector (DBR) layer that is provided on a side of the first substrate opposite to the second substrate and reflects the light having the wavelength, and a second DBR layer that is provided on a side of the second substrate opposite to the first substrate and reflects the light having the wavelength.

The second substrate is a circuit substrate.

In order to achieve the above-mentioned object, a method of producing a vertical cavity surface emitting laser element array according to an embodiment of the present technology includes: forming a first substrate that is formed of a first material and includes an active layer.

A second substrate that is formed of a second material is formed, the second material causing light having a specific wavelength to be transmitted therethrough and being different from that of the first substrate.

The first substrate and the second substrate are bonded to each other to form a structure in which the first substrate and the second substrate are located between a first distributed Bragg reflector (DBR) layer that reflects the light having the wavelength and a second DBR layer that reflects the light having the wavelength.

MODE(S) FOR CARRYING OUT THE INVENTION

A vertical cavity surface emitting laser (VCSEL) element according to an embodiment of the present technology will be described.

Structure of VCSEL Element

Figure 1:
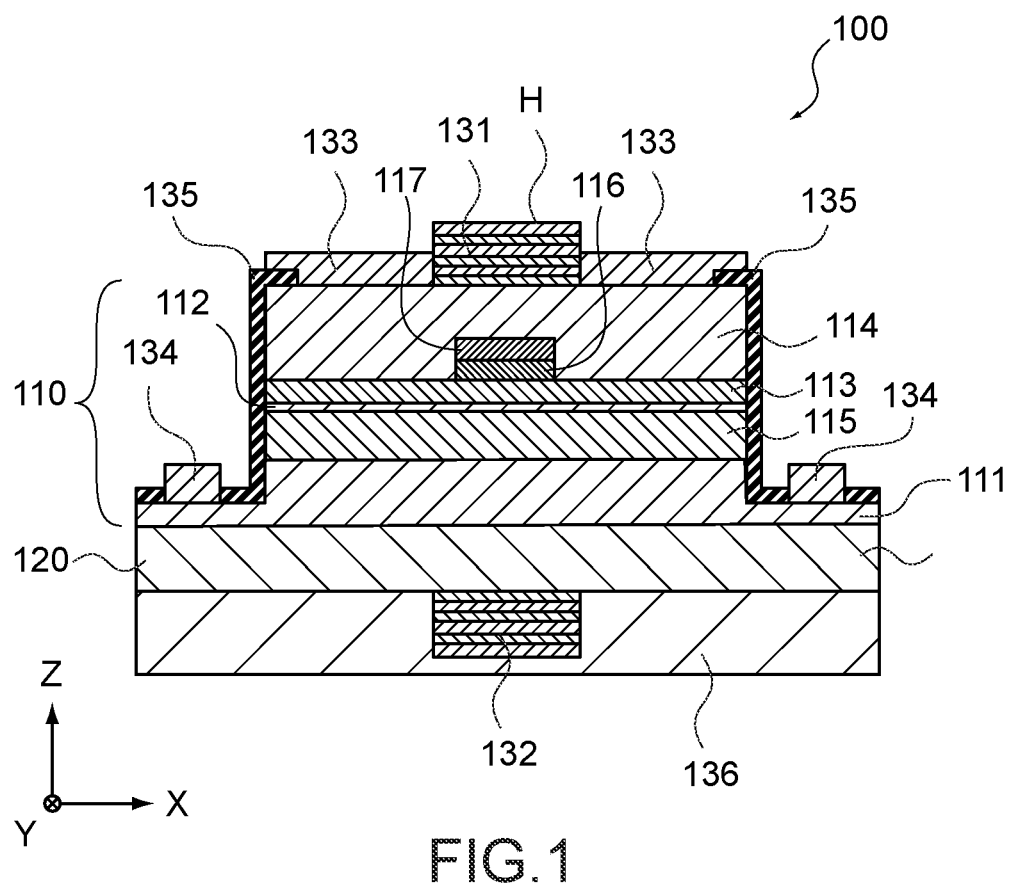
FIG. 1 is a cross-sectional view of a VCSEL element according to a first embodiment of the present technology.
Figure 2:
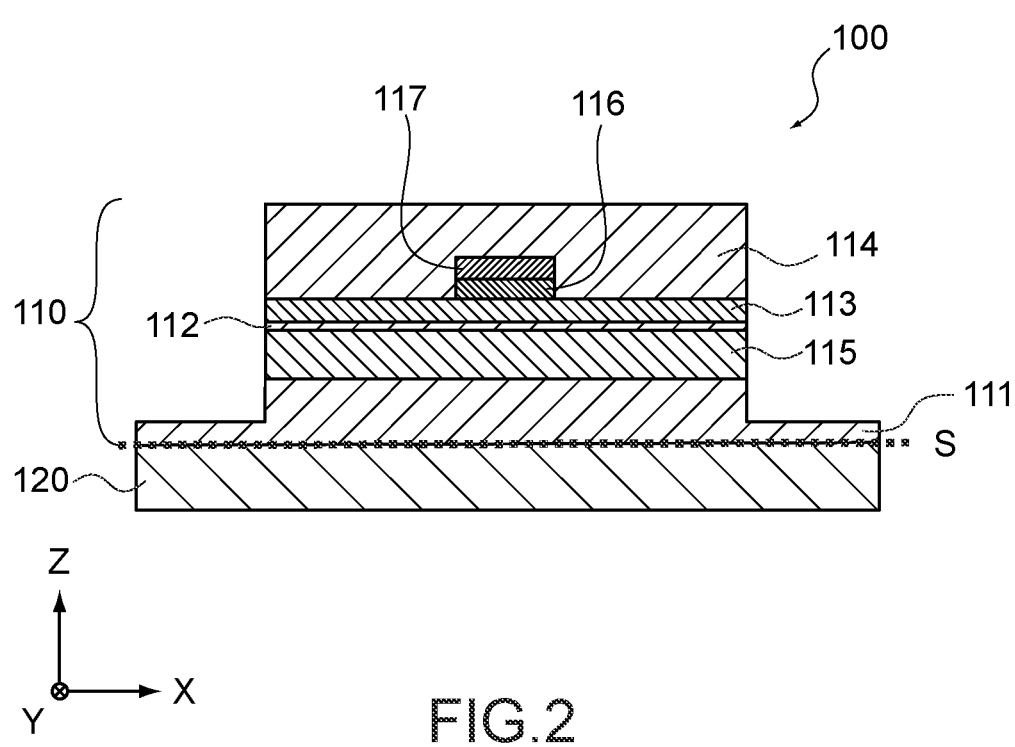
FIG. 2 is a cross-sectional view of a partial configuration of the VCSEL element.

FIG. 1 is a cross-sectional view of a VCSEL element 100 according to this embodiment, and FIG. 2 is a cross-sectional view of a partial configuration of the VCSEL element 100. As shown in these figures, the VCSEL element 100 includes a first substrate 110, a second substrate 120, a first DBR layer 131, a second DBR layer 132, a first electrode 133, a second electrode 134, a dielectric film 135, and a metal layer 136.

As shown in FIG. 2, the first substrate 110 includes a first semiconductor layer 111, a second semiconductor layer 112, a third semiconductor layer 113, a fourth semiconductor layer 114, an active layer 115, a first tunnel junction layer 116, and a second tunnel junction layer 117. The first semiconductor layer 111 is formed on the second substrate 120, and the active layer 115 is formed on the first semiconductor layer 111. The second semiconductor layer 112 is formed on the active layer 115, and the third semiconductor layer 113 is formed on the second semiconductor layer 112.

The first tunnel junction layer 116 is formed on a partial region of the third semiconductor layer 113, and the second tunnel junction layer 117 is formed on the first tunnel junction layer 116. The fourth semiconductor layer 114 is formed on the third semiconductor layer 113 and the second tunnel junction layer 117 to cover the first tunnel junction layer 116 and the second tunnel junction layer 117.

The first semiconductor layer 111, the second semiconductor layer 112, and the fourth semiconductor layer 114 are each formed of a semiconductor material having a first semiconductor type and are each formed of, for example, n-InP. The third semiconductor layer 113 is formed of a semiconductor material having a second semiconductor type and is formed of, for example, p-InP.

The active layer 115 emits and amplifies spontaneously emitted light. The active layer 115 has a multi-quantum well (MQW) structure in which a quantum well layer and a barrier layer are alternately laminated. The quantum well layer can be formed of, for example, InGaAsP, AlGaInAs, InGaAs, or InAs, and the barrier layer can be formed of, for example, GaAs, InGaAs, InGaAsP, or AlGaInAs. Further, the active layer 115 does not necessarily need to have a quantum well structure, and may have a quantum dot structure formed of InAs, or the like.

The first tunnel junction layer 116 and the second tunnel junction layer 117 form a current constriction structure by a tunnel junction. The first tunnel junction layer 116 is formed of a semiconductor material having a second semiconductor type and is formed of, for example, p$^+$-InP. The second tunnel junction layer 117 is formed of a semiconductor material having a second semiconductor type and is formed of, for example, n$^+$-InP.

Further, the first tunnel junction layer 116 and the second tunnel junction layer 117 do not necessarily need to be formed of InP, and may be formed of InGaAsP or AlGaInAs. In the case where the fourth semiconductor layer 114 is formed of InP, the first tunnel junction layer 116 and the second tunnel junction layer 117 make it possible to cause an action (light constriction action) of collecting light in the vicinity of the tunnel junction region because InGaAsP and AlGaInAs have a refractive index difference.

The first substrate 110 has the configuration as described above. The first substrate 110 can be obtained by forming each layer by doping and crystal growth on a base material formed of InP.

The second substrate 120 is formed of a material different from that of the first substrate 110, and is bonded to the first substrate 110. In FIG. 2, the boding interface between the first substrate 110 and the second substrate 120 is shown as a boding interface S. The material and the thickness of the second substrate 120 are configured such that light having an emission wavelength (hereinafter, the wavelength A) of the VCSEL element 100 is transmitted therethrough. Further, the second substrate 120 is suitably formed of a material having thermal conductivity higher than that of the material of the first substrate 110. For example, in the case where the first substrate 110 is formed of InP, the second substrate 120 can be formed of Si, SiC, AlN, or GaN.

Note that in the VCSEL element 100, the constituent material of each of the first substrate 110 and the second substrate 120 may be amorphized. Further, the lattice constants of the first substrate 110 and the second substrate 120 may differ via the boding interface S.

The first DBR layer 131 is provided on a side of the first substrate 110 opposite to the second substrate 120, and functions as a distributed Bragg reflector (DBR) that reflects light having the wavelength λ. The first DBR layer 131 can be a laminate of a plurality of layers obtained by alternately laminating a low-refractive index layer and a high-refractive index layer.

The first DBR layer 131 can be a dielectric DBR the low-refractive index layer can be formed of, for example, $SiO_2$, and the high-refractive index layer can be formed of, for example, $Ta_2O_5$. Further, the first DBR layer 131 can be a semiconductor DBR, the low-refractive index layer can be formed of, for example, AlGaAs, and the high-refractive index layer can be formed of, for example, GaAs. The thickness of each of the low-refractive index layer and the high-refractive index layer is suitably λ/4.

The second DBR layer 132 is provided on a side of the second substrate 120 opposite to the first substrate 110, and function as a DBR that reflects light having the wavelength λ. The second DBR layer 132 can be a laminate of a plurality of layers obtained by alternately laminating a low-refractive index layer and a high-refractive index layer.

The second DBR layer 132 can be a dielectric DBR, the low-refractive index layer can be formed of, for example, $SiO_2$, and the high-refractive index layer can be formed of, for example, $Ta_2O_5$. Further, the second DBR layer 132 can be a semiconductor DBR, the low-refractive index layer can be formed of, for example, AlGaAs, and the high-refractive index layer can be formed of, for example, GaAs. The thickness of each of the low-refractive index layer and the high-refractive index layer is suitably λ/4.

The first electrode 133 is formed of a metal, is provided on the first substrate 110 around the first DBR layer 131, and conducts to the fourth semiconductor layer 114. Note that in the case where the first DBR layer 131 is a semiconductor DBR, the first electrode 133 may be provided on the first DBR layer 131.

The second electrode 134 is formed of a metal, is provided on the first semiconductor layer 111, and conducts to the first semiconductor layer 111. Note that in the case where the second DBR layer 132 is a semiconductor DBR, the second electrode 134 may be provided on the second DBR layer 132.

The dielectric film 135 is formed of a dielectric material and is formed on end surfaces of the first semiconductor layer 111, the second semiconductor layer 112, the third semiconductor layer 113, and the fourth semiconductor layer 114. The metal layer 136 is formed of a metal and is provided on the second substrate 120 to cover the second DBR layer 132.

The VCSEL element 100 has the configuration as described above. Note that the material of each layer is not limited to the above-mentioned one, and an arbitrary material may be used as long as the VCSEL element 100 is capable of operating. For example, in the respective layers described above, the first semiconductor type (n-type) and the second semiconductor type (p-type) may be replaced with each other. Further, also the shape and the thickness of each layer can be appropriately adjusted.

Regarding Material of First Substrate

The first substrate 110 is not limited to the one including a base material formed of InP, and may be formed of another material. For example, the first substrate 110 can be formed of a group III-V element, and can be specifically one obtained by forming each layer by doping and crystal growth on a base material formed of GaAs.

In this case, the semiconductor material having the first semiconductor type can be formed of, for example, n-AlGaA, and the semiconductor material having the second semiconductor type can be formed of, for example, p-AlGaA. Further, the active layer 115 can be, for example, one obtained by laminating a quantum well layer formed of InGaAs or GaInNAs and a barrier layer formed of GaAs. In the case where the first substrate 110 is formed of GaAs, the second substrate 120 can be formed of a material having thermal conductivity higher than that of GaAs, e.g., Si, SiC, AlN, or GaN.

In addition, the first substrate 110 may be one obtained by forming each layer on a base material formed of GaN. As the material of the first substrate 110, a GaAs material, a GaN material, or the like can be used in addition to an InP material. The same applies to the following embodiments.

Operation of VCSEL Element

When a voltage is applied between the first electrode 133 and the second electrode 134, a current flows between the first electrode 133 and the second electrode 134. The current is subject to a constriction action by the tunnel junction in the first tunnel junction layer 116 and the second tunnel junction layer 117, and is injected into a region of the active layer 115 close to the first tunnel junction layer 116. As a result, spontaneously emitted light is generated in the region. The spontaneously emitted light travels in the lamination direction of the VCSEL element 100 (Z direction), and is reflected by the first DBR layer 131 and the second DBR layer 132.

The first DBR layer 131 and the second DBR layer 132 are configured to reflect light having the oscillation wavelength λ. Of the spontaneously emitted light, the component having the oscillation wavelength λ forms a standing wave between the first DBR layer 131 and the second DBR layer 132 and is amplified by the active layer 115.

When the injection current exceeds a threshold value, the light forming a standing wave performs laser oscillation, and a laser beam is emitted through the respective layers between the second semiconductor layer 112 and the first DBR layer 131. In FIG. 1, the surface through which a laser beam is emitted is shown as a light emission surface H.

Here, in the VCSEL element 100, the second substrate 120 is provided between the first DBR layer 131 and the second DBR layer 132 in the vicinity of the active layer 115, and the heat generated in the active layer 115 is transferred to the second substrate 120 and dissipated via the second substrate 120. Therefore, it is possible to realize the VCSEL element 100 that has low thermal resistance and is capable of operating at high temperature.

In particular, in the case where the second substrate 120 has thermal conductivity higher than that of the material of the first substrate 110, the heat dissipation increases and the thermal resistance can be reduced. Further, since a material having high thermal conductivity can be selected as the material of the second substrate 120 regardless of the material of the first substrate 110, the degree of freedom in setting and production process is high. Further, the second substrate 120 can be produced with a large diameter size, it is possible to reduce the production cost.

Method of Producing VCSEL Element

A method of producing the VCSEL element 100 will be described. FIG. 3 to FIG. 7 are each a schematic diagram showing a method of producing the VCSEL element 100.

Figure 3:
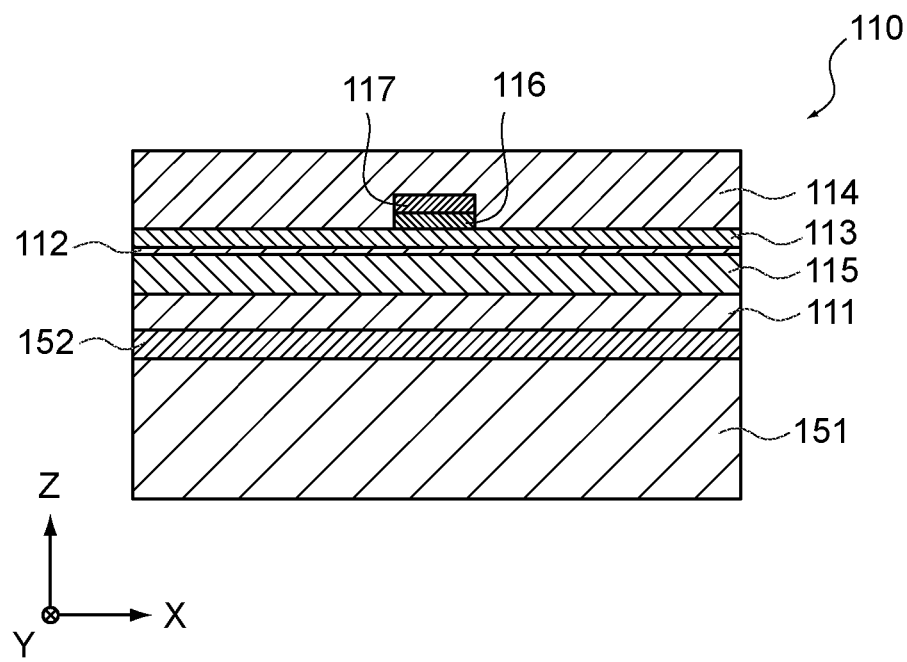
FIG. 3 is a schematic diagram showing a method of producing the VCSEL element.

First, as shown in FIG. 3, the first substrate 110 is prepared. The first substrate 110 can be produced by forming, on a base material 151, an etch stop layer 152, the first semiconductor layer 111, the active layer 115, the second semiconductor layer 112, the third semiconductor layer 113, the first tunnel junction layer 116, the second tunnel junction layer 117, and the fourth semiconductor layer 114 by epitaxial crystal growth.

The first tunnel junction layer 116 and the second tunnel junction layer 117 can be formed by a lithography process. The base material 151 can be formed of InP or GaAs. Further, the etch stop layer 152 can be formed of InGaAs or InGaAsP.

Figure 4:
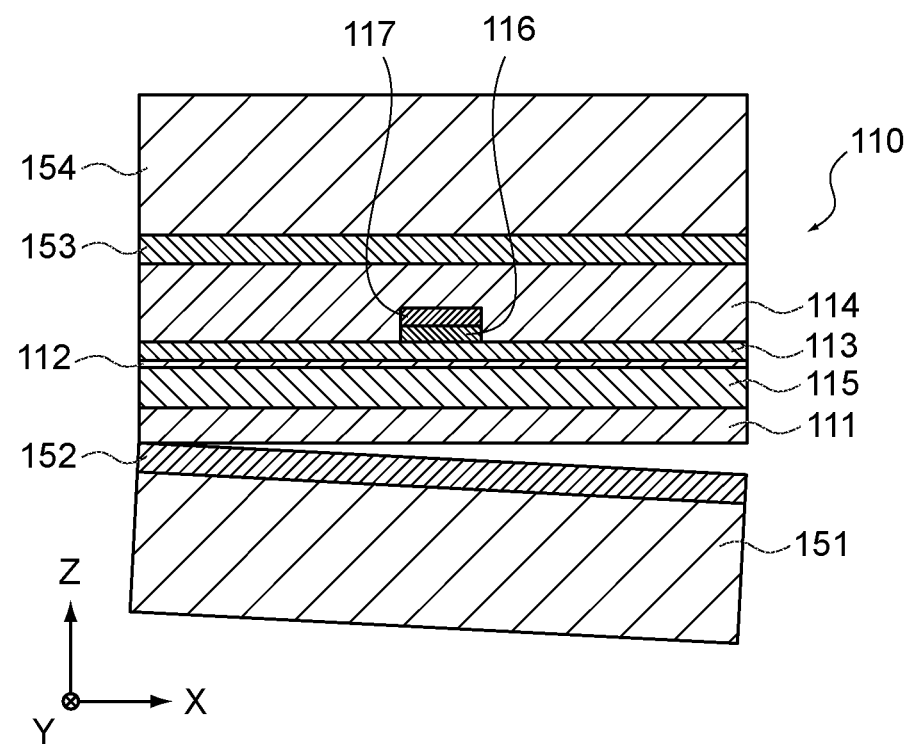
FIG. 4 is a schematic diagram showing a method of producing the VCSEL element.

Subsequently, as shown in FIG. 4, the first substrate 110 is temporarily attached to a support substrate 154 with an adhesive layer 153 to remove the base material 151. The adhesive layer 153 can be formed of wax and the support substrate 154 can be formed of InP or glass.

Figure 5:
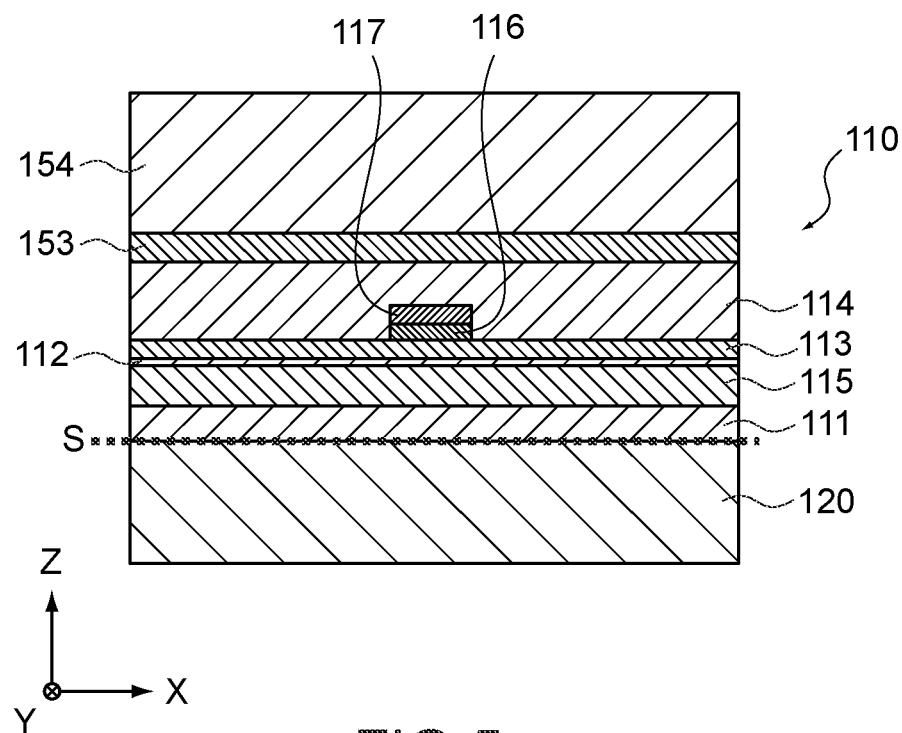
FIG. 5 is a schematic diagram showing a method of producing the VCSEL element.

Subsequently, as shown in FIG. 5, the second substrate 120 is bonded to the surface of the first substrate 110 on the side of the first semiconductor layer 111. In the figure, the boding interface between the first substrate 110 and the second substrate 120 is shown as the boding interface S. For this bonding, an arbitrary bonding method such as surface activated bonding, dehydration condensation bonding, and thermal diffusion bonding can be used. Note that by applying chemical mechanical polishing to the boding interface S, it is possible to further improve the bonding strength.

Figure 6:
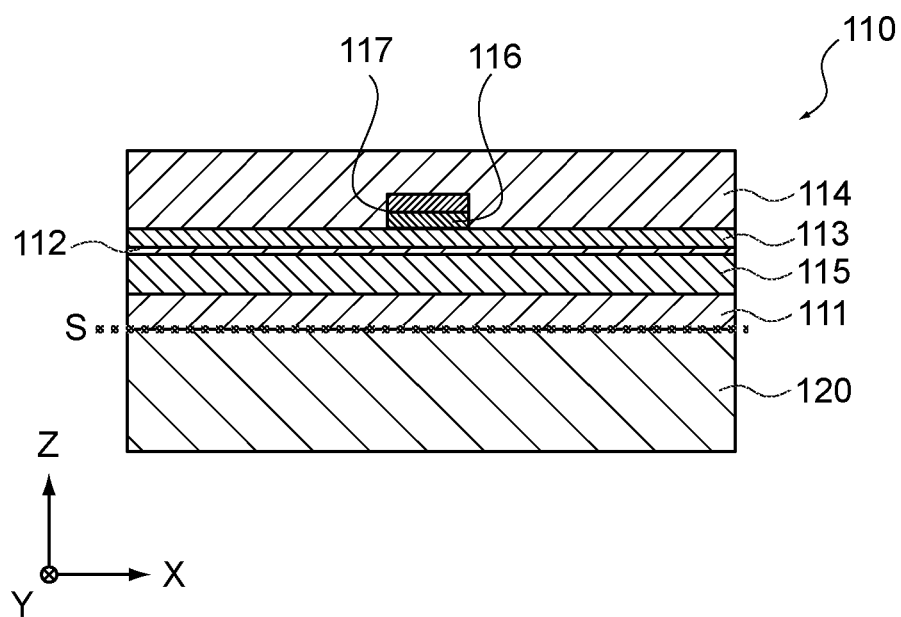
FIG. 6 is a schematic diagram showing a method of producing the VCSEL element.
Figure 7:
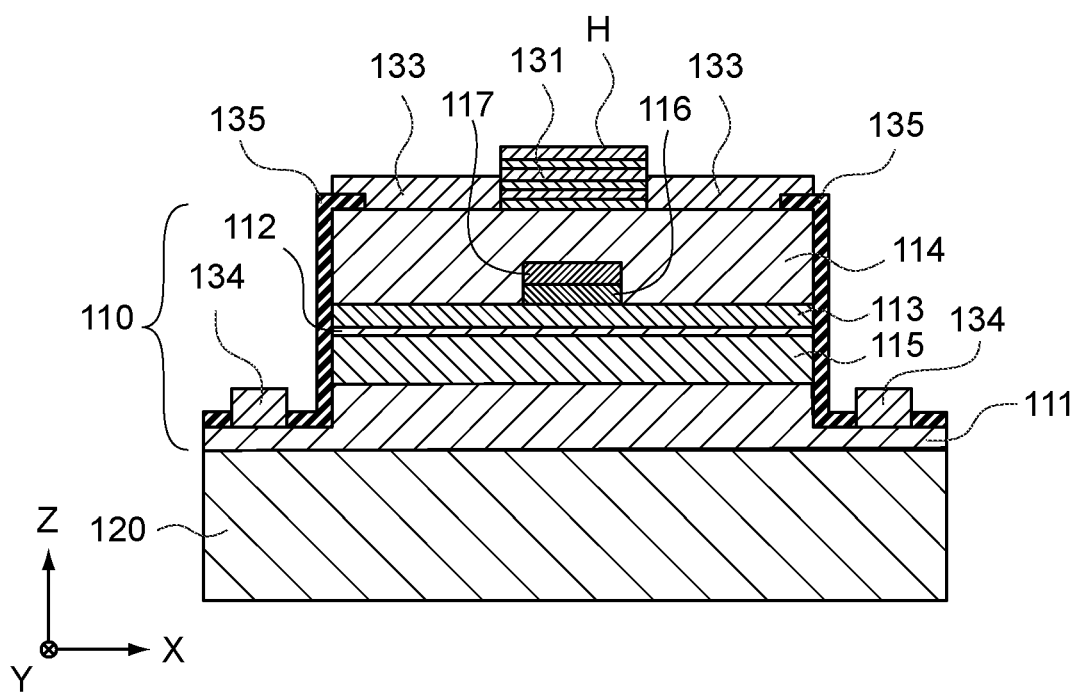
FIG. 7 is a schematic diagram showing a method of producing the VCSEL element.

Subsequently, as shown in FIG. 6, the adhesive layer 153 and the support substrate 154 are removed. The support substrate 154 can be removed by heating the adhesive layer 153 with an oven or the like for melting and removing it with an organic solvent. Subsequently, as shown in FIG. 7, after forming a mesa (plateau-like structure) in the first substrate 110, the first DBR layer 131, the first electrode 133, the second electrode 134, and the dielectric film 135 are formed on the first substrate 110.

Subsequently, as shown in FIG. 1, the second substrate 120 is thinned to form the second DBR layer 132 and the metal layer 126. The thinning of the second substrate 120 may be performed using a back grinder, or may be performed by using the second substrate 120 as a SOI (Silicon on Insulator) substrate and removing the base material and the oxide film. The VCSEL element 100 can be prepared in this way. Note that although the second substrate 120 is bonded after etching the base material 151 in the production method, the second substrate 120 may be bonded to the surface of the base material 151 without removing the base material 151.

Modified Example

Figure 8:
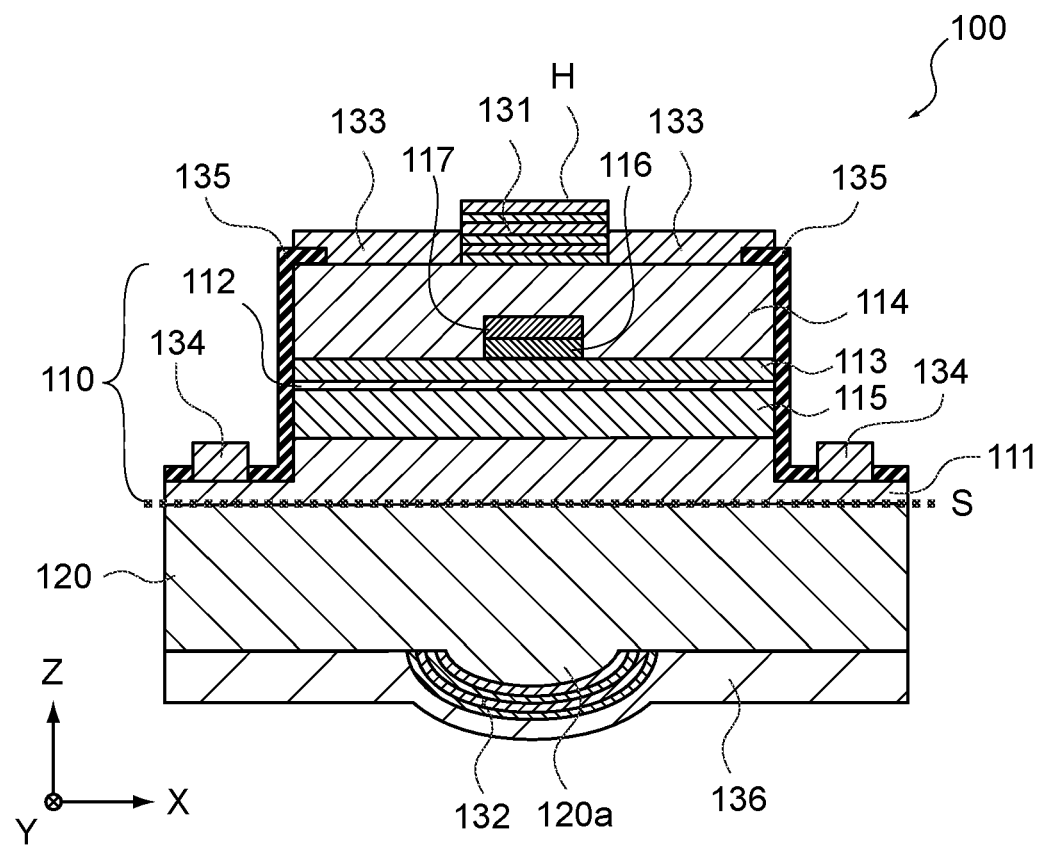
FIG. 8 is a cross-sectional view of a VCSEL element according to a first modified example of the first embodiment.

A modified example of the VCSEL element 100 will be described. FIG. 8 is a cross-sectional view of the VCSEL element 100 according to a first modified example. As shown in the figure, the second substrate 120 is thickened, and a projecting portion 120a having a lens shape is provided on a side of the second substrate 120 opposite to the first substrate 210. The shape of the projecting portion 120a may be a spherical lens shape, a cylindrical lens shape, or another lens shape.

As a result, each layer of the second DBR layer 132 formed on the projecting portion 120a is curved in a recessed shape along the shape of the projecting portion 120a, and also the metal layer 136 formed on the second DBR layer 132 is curved in a recessed shape along the shape of the second DBR layer 132. For this reason, a lens structure is formed by the second DBR layer 232 and the metal layer 236.

In this configuration, since the thickness of the first substrate 120 is increased, the heat dissipation is further improved. Further, since a lens structure is formed in the second DBR layer 132 and the metal layer 136, light emitted from the active layer 215 is collected by the lens structure on a constriction region of the active layer 115 by the tunnel junction, thereby achieving a light constriction action. As a result, the light emission efficiency is improved.

Figure 9:
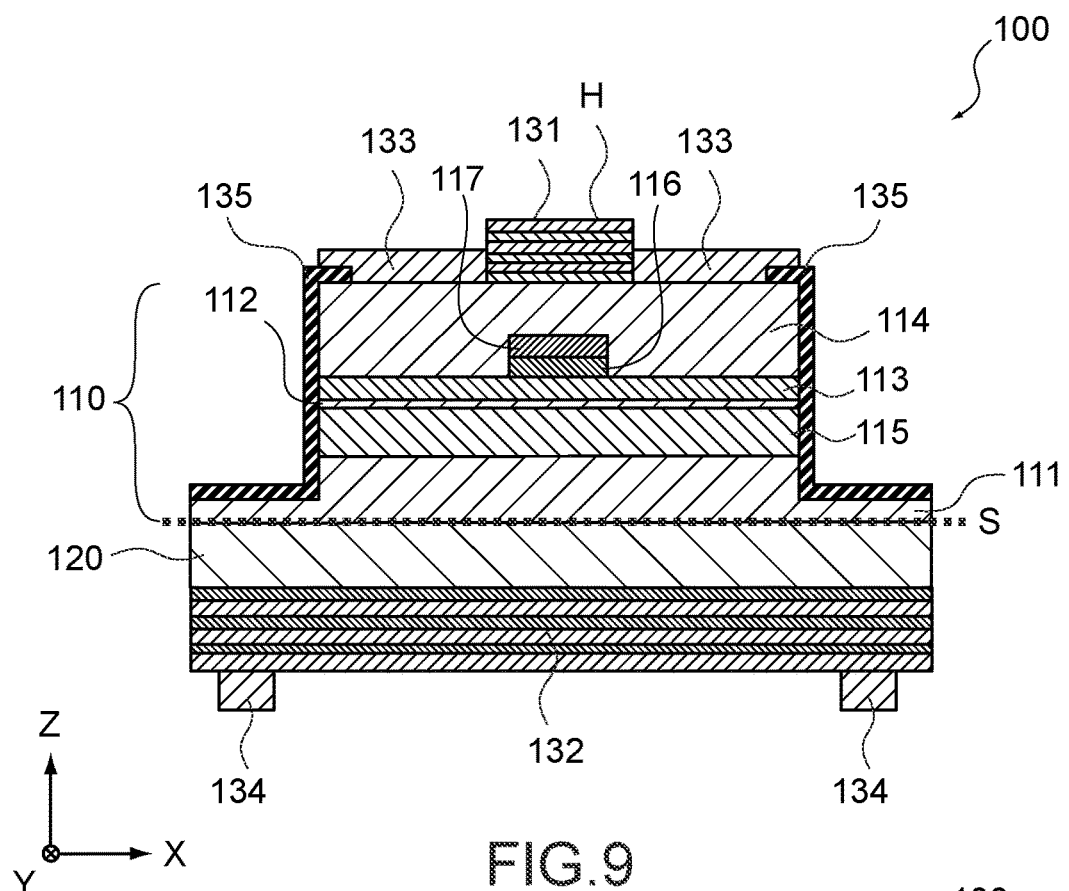
FIG. 9 is a cross-sectional view of a VCSEL element according to a second modified example of the first embodiment.

Further, FIG. 9 is a cross-sectional view of the VCSEL element 100 according to a second modified example. As shown in the figure, the metal layer 136 does not necessarily need to be provided on the second substrate 120 and only the second DBR layer 132 may be provided. In the case where the second DBR layer 132 is a semiconductor DBR, the second electrode 134 can be provided on the second DBR layer 132 of the second electrode 134 as shown in FIG. 9.

Figure 10:
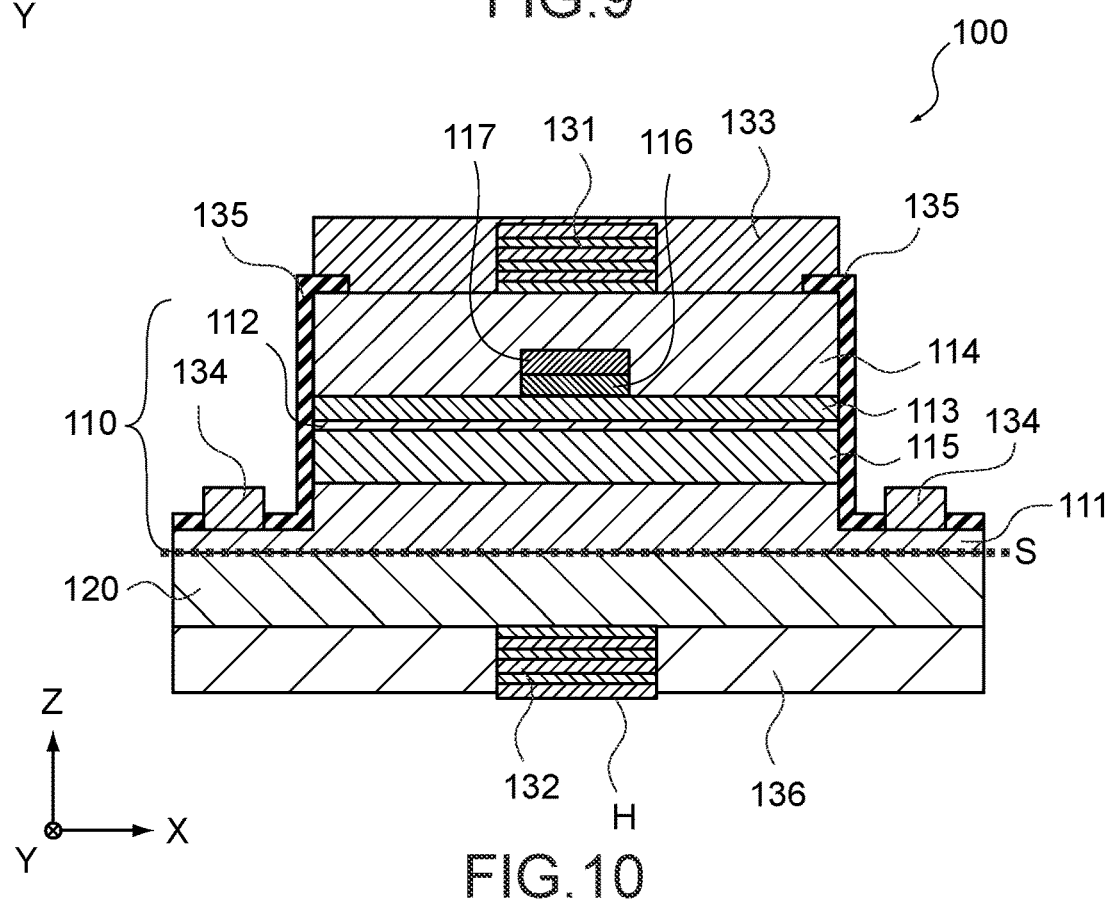
FIG. 10 is a cross-sectional view of a VCSEL element according to a third modified example of the first embodiment.

Further, FIG. 10 is a cross-sectional view of the VCSEL element 100 according to a third modified example. As shown in the figure, the first electrode 133 is formed to cover the first DBR layer 131, and the metal layer 136 is formed not to cover the second DBR layer 132. In this configuration, by adjusting the materials of the first DBR layer 131 and the second DBR layer 132 and the number of laminated layers, it is possible to cause a laser beam to be emitted from the side of the second DBR layer 132. In FIG. 10, the light emission surface H from which a laser beam is emitted is shown.

Second Embodiment

A VCSEL element according to a second embodiment of the present technology will be described.

Structure of VCSEL Element

Figure 11:
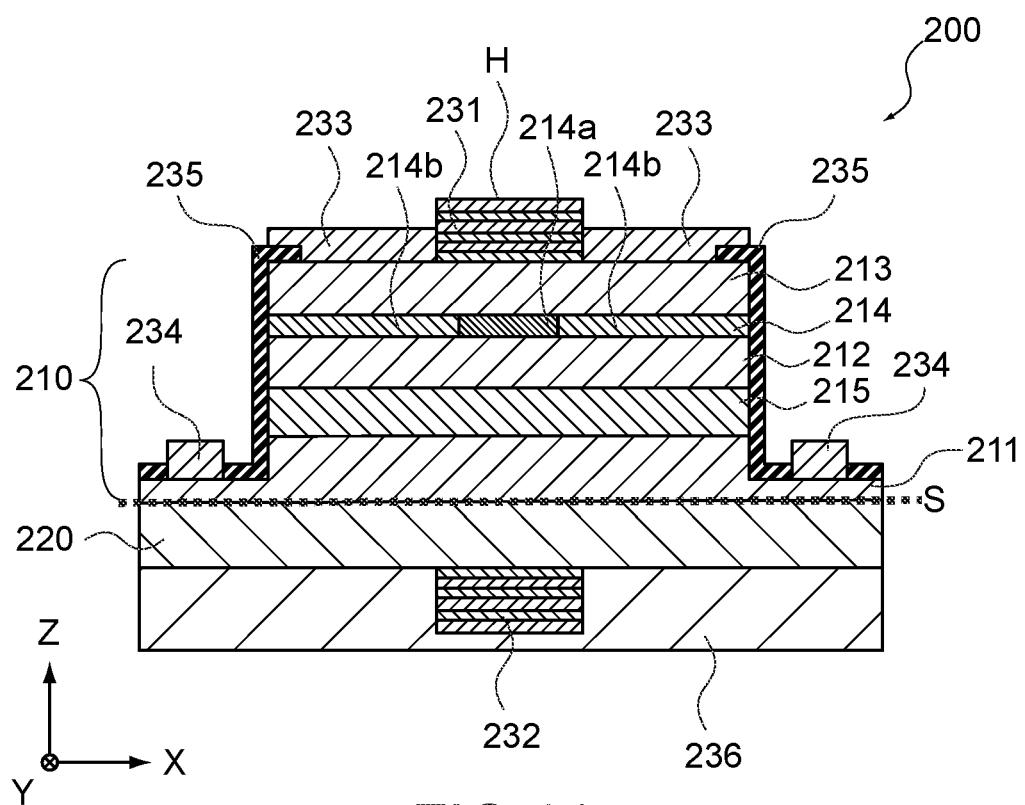
FIG. 11 is a cross-sectional view of a VCSEL element according to a second embodiment of the present technology.

FIG. 11 is a cross-sectional view of a VCSEL element 200 according to this embodiment. As shown in the figure, the VCSEL element 200 includes a first substrate 210, a second substrate 220, a first DBR layer 231, a second DBR layer 232, a first electrode 233, a second electrode 234, a dielectric film 235, and a metal layer 236.

As shown in FIG. 11, the first substrate 210 includes a first semiconductor layer 211, a second semiconductor layer 212, a third semiconductor layer 213, a constriction layer 214, and an active layer 215. The first semiconductor layer 211 is formed on the second substrate 220, and the active layer 215 is formed on the first semiconductor layer 211.

The second semiconductor layer 212 is formed on the active layer 215, and the constriction layer 214 is formed on the second semiconductor layer 212. The third semiconductor layer 213 is formed on the constriction layer 214. The first semiconductor layer 211 and the second semiconductor layer 212 are each formed of a material having a first semiconductor type and is formed of, for example, n-InP.

The third semiconductor layer 213 is formed of a material having a second semiconductor type and is formed of, for example, p-InP.

The constriction layer 214 imparts a constriction action to a current. The constriction layer 214 includes an injection region 214a and a constriction region 214b. The injection region 214a is provided in the central portion of the constriction layer 214 and is a region having high conductivity. The injection region 214a is formed of, for example, InAlAs.

The constriction region 214b is provided around the injection region 214a and is a region having conductivity lower than that of the injection region 214a. The constriction region 214b can be formed of a material obtained by oxidizing the constituent material of the injection region 214a. As a result, a current flowing through the constriction layer 214 is concentrated in the injection region 214a, i.e., the constriction layer 214 forms a current constriction structure.

The active layer 215 emits and amplifies spontaneously emitted light. The active layer 215 has a multi-quantum well structure in which a quantum well layer and a barrier layer are alternately laminated. The quantum well layer can be formed of, for example, InGaAsP, AlGaInAs, InGaAs, or InAs, and the barrier layer can be formed of, for example, GaAs, InGaAs, InGaAsP, or AlGaInAs. Further, the active layer 215 does not necessarily need to have a quantum well structure, and may have a quantum dot structure formed of InAs, or the like.

The second substrate 220, the first DBR layer 231, the second DBR layer 232, the first electrode 233, the second electrode 234, the dielectric film 235, and the metal layer 236 respectively have the same configurations as those of the second substrate 120, the first DBR layer 131, the second DBR layer 132, the first electrode 133, the second electrode 134, the dielectric film 135, and the metal layer 136 according to the first embodiment. That is, the second substrate 220 is formed of a material that causes light having the wavelength λ to be transmitted therethrough and is different from that of the first substrate 210, and is bonded to the first substrate 210 in the boding interface S.

The VCSEL element 200 has the configuration as described above. Note that the material of each layer is not limited to the above-mentioned one, and an arbitrary material may be used as long as the VCSEL element 200 is capable of operating. For example, in the respective layers described above, the first semiconductor type (n-type) and the second semiconductor type (p-type) may be replaced with each other. Further, also the shape and the thickness of each layer can be appropriately adjusted.

Further, also in the VCSEL element 200, a lens structure (see FIG. 8) may be formed in the second substrate 220 and the second DBR layer 232 may be provided instead of the metal layer 236 (see FIG. 9), similarly to the first embodiment. Further, a laser beam may be emitted from the side of the second DBR layer 232 (see FIG. 10).

Operation of VCSEL Element

The VCSEL element 200 operates in the same way as the VCSEL element 100 according to the first embodiment except that the current is constricted by the constriction layer 214, and heat is dissipated by the second substrate 220. Therefore, it is possible to realize the VCSEL element 200 that has low thermal resistance and is capable of operating at high temperature.

Method of Producing VCSEL Element

The VCSEL element 200 can be produced by bonding the first substrate 210 and the second substrate 220 to each other, similarly to the first embodiment. The constriction region 214b can be formed by forming a mesa in the first substrate 210 and then applying oxidation treatment to the constituent material of the constriction layer 214.

Third Embodiment

A VCSEL element according to a third embodiment of the present technology will be described.

Structure of VCSEL Element

Figure 12:
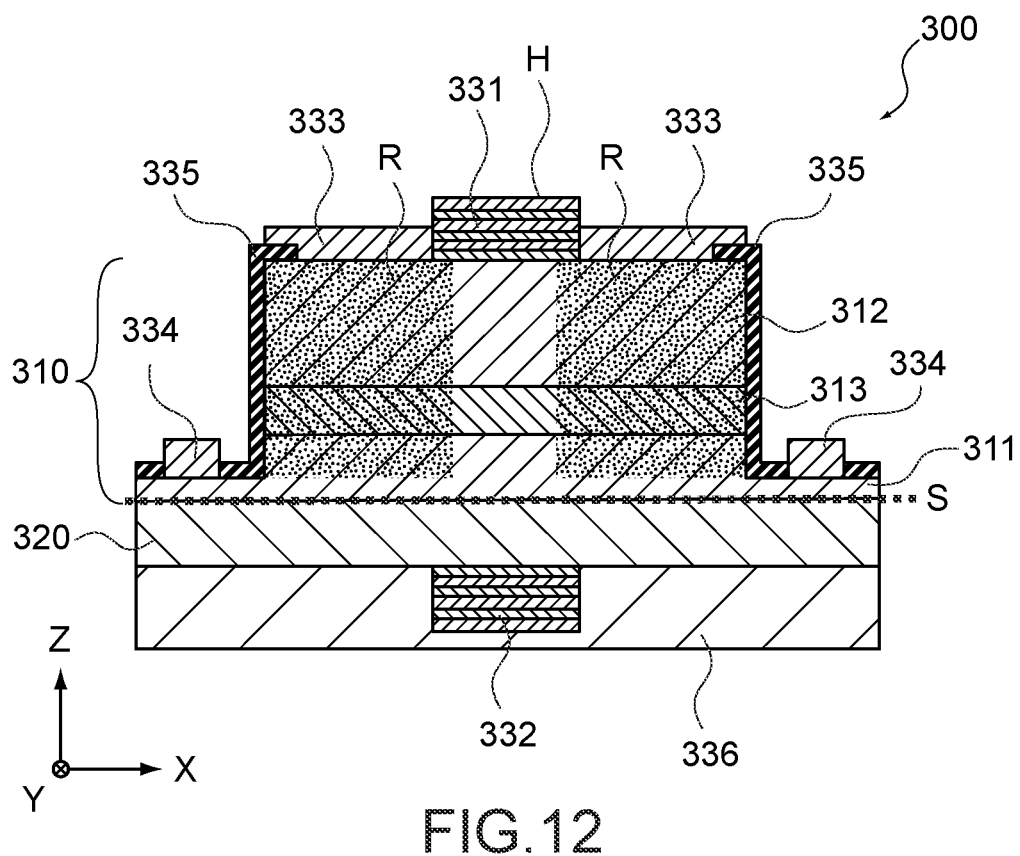
FIG. 12 is a cross-sectional view of a VCSEL element according to a third embodiment of the present technology.

FIG. 12 is a cross-sectional view of a VCSEL element 300 according to this embodiment. As shown in the figure, the VCSEL element 300 includes a first substrate 310, a second substrate 320, a first DBR layer 331, a second DBR layer 332, a first electrode 333, a second electrode 334, a dielectric film 335, and a metal layer 336.

As shown in FIG. 12, the first substrate 310 includes a first semiconductor layer 311, a second semiconductor layer 312, and an active layer 313. The first semiconductor layer 311 is formed on the second substrate 320, and the active layer 313 is formed on the first semiconductor layer 311. The second semiconductor layer 312 is formed on the active layer 313. The first semiconductor layer 311 is formed of a material having a first semiconductor type and is formed of, for example, n-InP. The second semiconductor layer 312 is formed of a material having a second semiconductor type and is formed of, for example, p-InP.

The active layer 313 emits and amplifies spontaneously emitted light. The active layer 313 has a multi-quantum well structure in which a quantum well layer and a barrier layer are alternately laminated. The quantum well layer is formed of, for example, InGaAsP, AlGaInAs, InGaAs, or InAs, and the barrier layer is formed of, for example, GaAs, InGaAs, InGaAsP, or AlGaInAs. Further, the active layer 313 does not necessarily need to have a quantum well structure, and may have a quantum dot structure formed of InAs, or the like.

The first semiconductor layer 311, the second semiconductor layer 312, and the active layer 313 are subjected to high resistance treatment except for a central portion. In FIG. 11, a region subjected to high resistance treatment is shown as a high resistance region R. The high resistance treatment is, for example, ion implantation of boron. As a result, a current flowing through the first semiconductor layer 311, the second semiconductor layer 312, and the active layer 313 becomes difficult to flow in the high resistance region R, thereby forming a current constriction structure.

The second substrate 320, the first DBR layer 331, the second DBR layer 332, the first electrode 333, the second electrode 334, the dielectric film 335, and the metal layer 336 respectively have the same configurations as those in the second substrate 120, the first DBR layer 131, the second DBR layer 132, the first electrode 133, the second electrode 134, the dielectric film 135, and the metal layer 136 according to the first embodiment. That is, the second substrate 320 is formed of a material that causes light having the wavelength λ to be transmitted therethrough and is different from that of the first substrate 310, and is bonded to the first substrate 310 in the boding interface S.

The VCSEL element 300 has the configuration as described above. Note that the material of each layer is not limited to the above-mentioned one, and an arbitrary material may be used as long as the VCSEL element 300 is capable of operating. For example, in the respective layers described above, the first semiconductor type (n-type) and the second semiconductor type (p-type) may be replaced with each other. Further, also the shape and the thickness of each layer can be appropriately adjusted.

Further, also in the VCSEL element 300, a lens structure (see FIG. 8) may be formed in the second substrate 320 and the second DBR layer 332 may be provided instead of the metal layer 336 (see FIG. 9), similarly to the first embodiment. Further, a laser beam may be emitted from the side of the second DBR layer 332 (see FIG. 10).

Operation of VCSEL Element

The VCSEL element 300 operates in the same way as the VCSEL element 100 according to the first embodiment except that a current is constricted by the high resistance region R, and heat is dissipated by the second substrate 320. Therefore, it is possible to realize the VCSEL element 300 that has low thermal resistance and is capable of operating at high temperature.

Method of Producing VCSEL Element

The VCSEL element 300 can be produced by bonding the first substrate 310 and the second substrate 320 to each other, similarly to the first embodiment. The high resistance region R can be formed by forming a mesa in the first substrate 310 and then performing ion implantation after masking the central portion of the mesa.

Fourth Embodiment

A VCSEL element according to a fourth embodiment of the present technology will be described.

Structure of VCSEL Element

Figure 13:
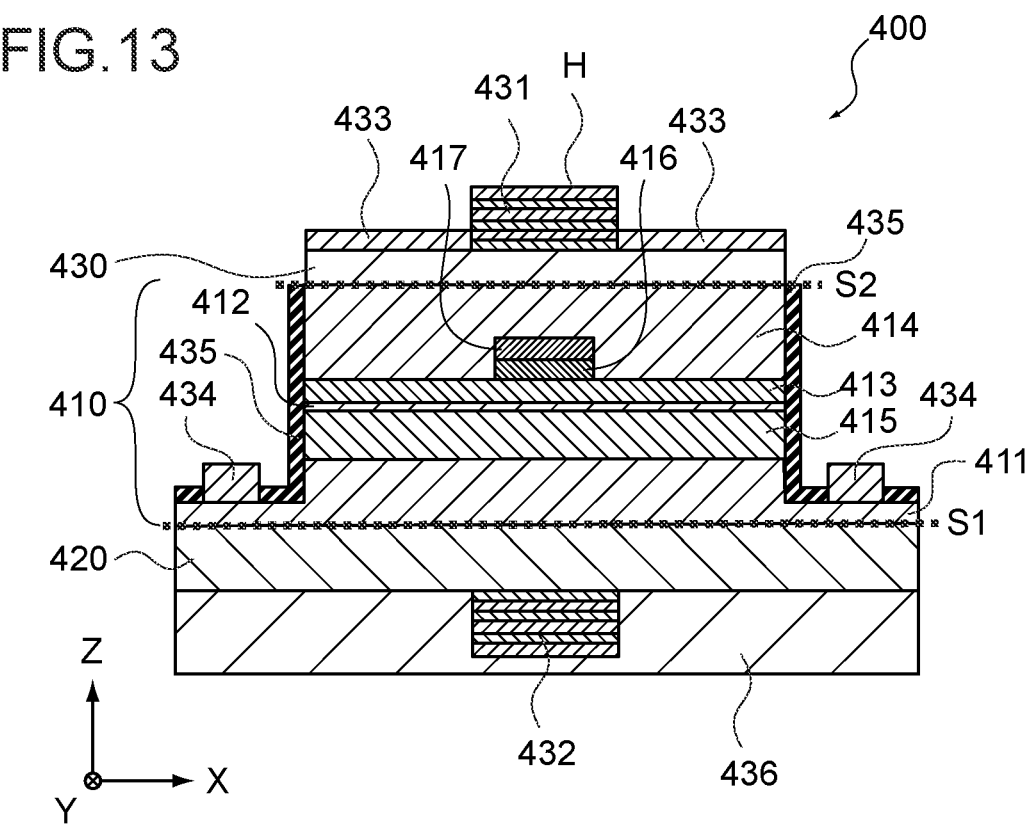
FIG. 13 is a cross-sectional view of a VCSEL element according to a fourth embodiment of the present technology.

FIG. 13 is a cross-sectional view of a VCSEL element 400 according to this embodiment. As shown in the figure, the VCSEL element 400 includes a first substrate 410, a second substrate 420, a third substrate 430, a first DBR layer 431, a second DBR layer 432, a first electrode 433, a second electrode 434, a dielectric film 435, and a metal layer 436.

The first substrate 410, the second substrate 420, the second DBR layer 432, the second electrode 434, the dielectric film 435, and the metal layer 436 respectively have the same configurations as those of the first substrate 110, the second substrate 120, the second DBR layer 132, the second electrode 134, the dielectric film 135, and the metal layer 136 according to the first embodiment.

That is, the first substrate 410 includes a first semiconductor layer 411, a second semiconductor layer 412, a third semiconductor layer 413, a fourth semiconductor layer 414, an active layer 415, a first tunnel junction layer 416, and a second tunnel junction layer 417, and respectively have the same configurations as those of the first semiconductor layer 111, the second semiconductor layer 112, the third semiconductor layer 113, the fourth semiconductor layer 114, the active layer 115, the first tunnel junction layer 116, and the second tunnel junction layer 117.

The second substrate 420 is formed of a material that causes light having the wavelength λ to be transmitted therethrough and is different from that of the first substrate 410, and is bonded to the first substrate 410. In FIG. 13, the boding interface between the first substrate 410 and the second substrate 420 is shown as a boding interface S1.

The third substrate 430 is formed of material different from that of the first substrate 410, and is bonded to a side of the first substrate 410 opposite to the boding interface S1. In FIG. 13, the boding interface between the first substrate 410 and the third substrate 430 is shown as a boding interface S2. The material and the thickness of the third substrate 430 are configured such that light having the emission wavelength λ of the VCSEL element 400 is transmitted therethrough.

Further, the third substrate 430 is suitably formed of a material having thermal conductivity higher than that of the material of the first substrate 410, and can be formed of, for example, Si, SiC, AlN, or GaN. The material of the third substrate 430 may be the same as or different from the material of the second substrate 420.

The first DBR layer 431 is provided on a side of the third substrate 430 opposite to the first substrate 410, and functions as a DBR that reflects light having the wavelength λ. The first DBR layer 431 can be a laminate of a plurality of layers obtained by alternately laminating a low-refractive index layer and a high-refractive index layer.

The first DBR layer 431 can be a dielectric DBR, the low-refractive index layer can be formed of, for example, $SiO_2$, and the high-refractive index layer can be formed of, for example, $Ta_2O_5$. Further, the first DBR layer 431 can be a semiconductor DBR, the low-refractive index layer can be formed of, for example, AlGaAs, and the high-refractive index layer can be formed of, for example, GaAs. The thickness of each of the low-refractive index layer and the high-refractive index layer is suitably λ/4.

The first electrode 433 is formed of a metal, is provided around the first DBR layer 431 on the third substrate 430, and conducts to the third substrate 430. Note that in the case where the first DBR layer 431 is a semiconductor DBR, the first electrode 433 may be provided on the first DBR layer 431.

The VCSEL element 400 has the configuration as described above. Note that the material of each layer is not limited to the above-mentioned one, and an arbitrary material may be used as long as the VCSEL element 400 is capable of operating. For example, in the respective layers described above, the first semiconductor type (n-type) and the second semiconductor type (p-type) may be replaced with each other. Further, also the shape and the thickness of each layer can be appropriately adjusted.

Operation of VCSEL Element

The VCSEL element 400 operates in the same way as the VCSEL element 400 according to the first embodiment. Here, in the VCSEL element 400, the second substrate 420 and the third substrate 430 are provided between the first DBR layer 431 and the second DBR layer 432. As a result, since the heat generated in the active layer 415 is dissipated from not only the second substrate 420 but also the third substrate 430, the VCSEL element 400 has higher heat dissipation and is suitable for operating at high temperature.

Method of Producing VCSEL Element

The VCSEL element 400 can be produced by bonding the second substrate 420 and the third substrate 430 to the first substrate 410. The third substrate 430 can be bonded to the first substrate 410 by the same way as that of the second substrate 420.

Modified Example

Figure 14:
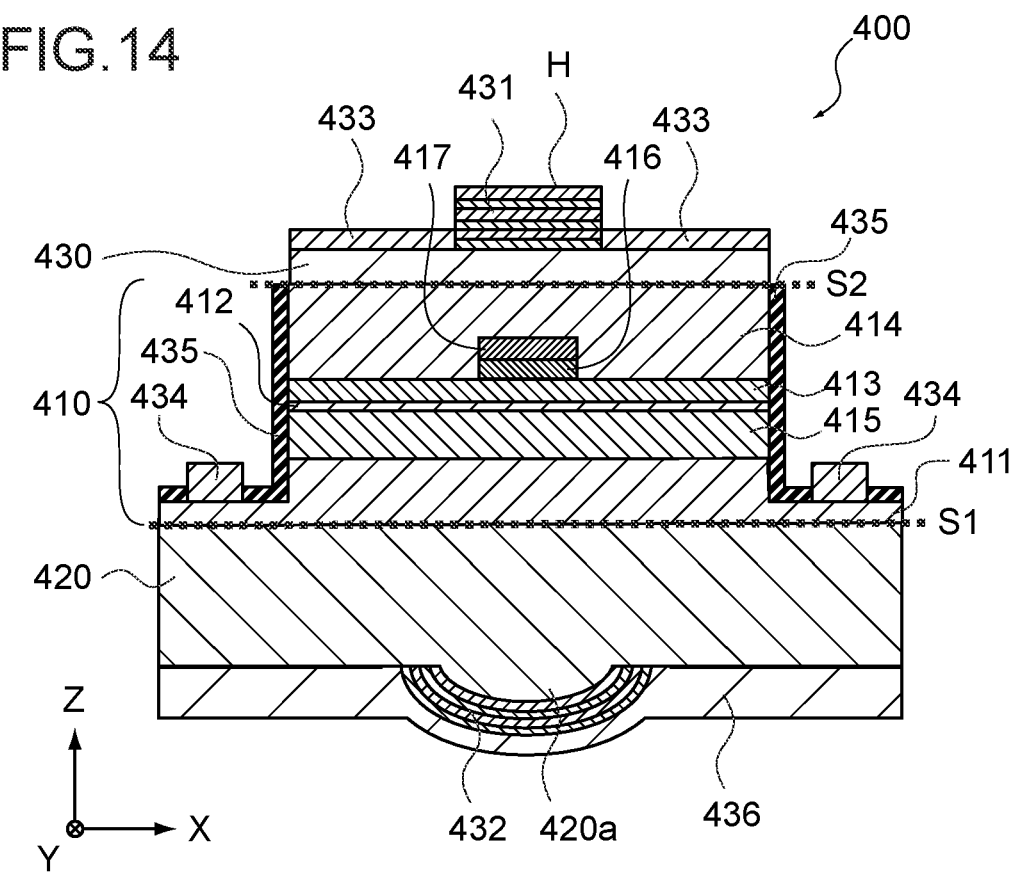
FIG. 14 is a cross-sectional view of a VCSEL element according to a first modified example of the fourth embodiment.

A modified example of the VCSEL element 400 will be described. FIG. 14 is a cross-sectional view of the VCSEL element 400 according to a first modified example. As shown in the figure, a projecting portion 420a having a lens shape is provided on the surface of the second substrate 420 opposite to the first substrate 410. The shape of the projecting portion 420a may be a spherical lens shape, a cylindrical lens shape, or another lens shape As a result, each layer of the second DBR layer 432 formed on the projecting portion 420a is curved in a recessed shape along the shape of the projecting portion 420a, and also the metal layer 436 formed on the second DBR layer 432 is curved in a recessed shape along the shape of the second DBR layer 432. For this reason, a lens structure is formed by the second DBR layer 432 and the metal layer 436.

In this configuration, since a lens structure is formed by the second DBR layer 432 and the metal layer 436, light emitted from the active layer 415 is collected by the lens structure on a constriction region of the active layer 415 by the tunnel junction, thereby achieving a light constriction action. As a result, the light emission efficiency is improved.

Figure 15:
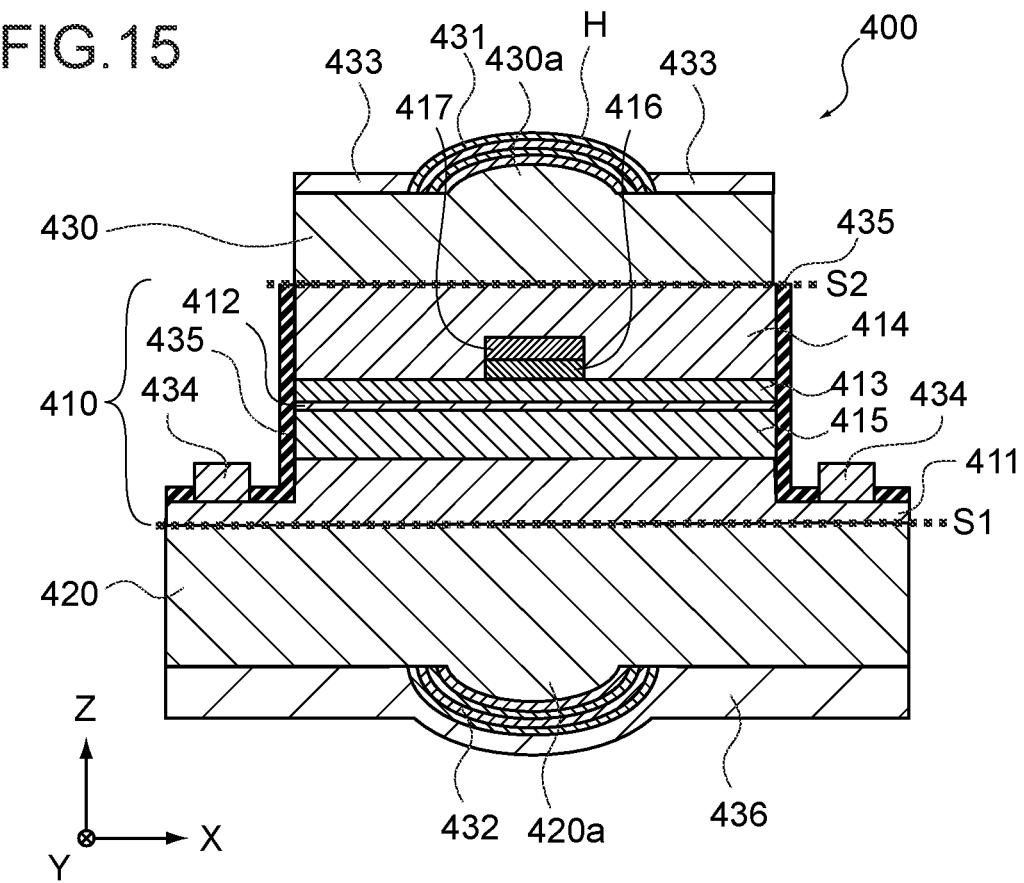
FIG. 15 is a cross-sectional view of a VCSEL element according to a second modified example of the fourth embodiment.

FIG. 15 is a cross-sectional view of the VCSEL element 400 according to a second modified example. As shown in the figure, in addition to the projecting portion 420a provided on the second substrate 420, a projecting portion 430a having a lens shape is provided on the surface of the third substrate 430 opposite to the first substrate 410. The shape of the projecting portion 430a may be a spherical lens shape, a cylindrical lens shape, or another lens shape.

As a result, each layer of the first DBR layer 431 formed on the projecting portion 430a is curved in a recessed shape along the shape of the projecting portion 430a to form a lens structure. In this configuration, since a lens structure is formed in both the second substrate 420 and the third substrate 430, light emitted from the active layer 415 is collected by both the lens structures on a constriction region of the active layer 415 by the tunnel junction, thereby achieving a light constriction action. As a result, the light emission efficiency is further improved.

Note that in the VCSEL element 400, a lens structure does not necessarily need to be provided on the second substrate 420 and a lens structure may be provided only on the third substrate 430. Further, the VCSEL element 400 may be configured such that a laser beam is emitted to the side of the second substrate 420. Further, although the VCSEL element 400 has a current constriction structure by a tunnel junction in this embodiment, the VCSEL element 400 may have a current constriction structure by oxidization according to the second embodiment or a current constriction structure by high resistance according to the third embodiment.

Fifth Embodiment

A VCSEL element array according to a fifth embodiment of the present technology will be described.

Figure 16:
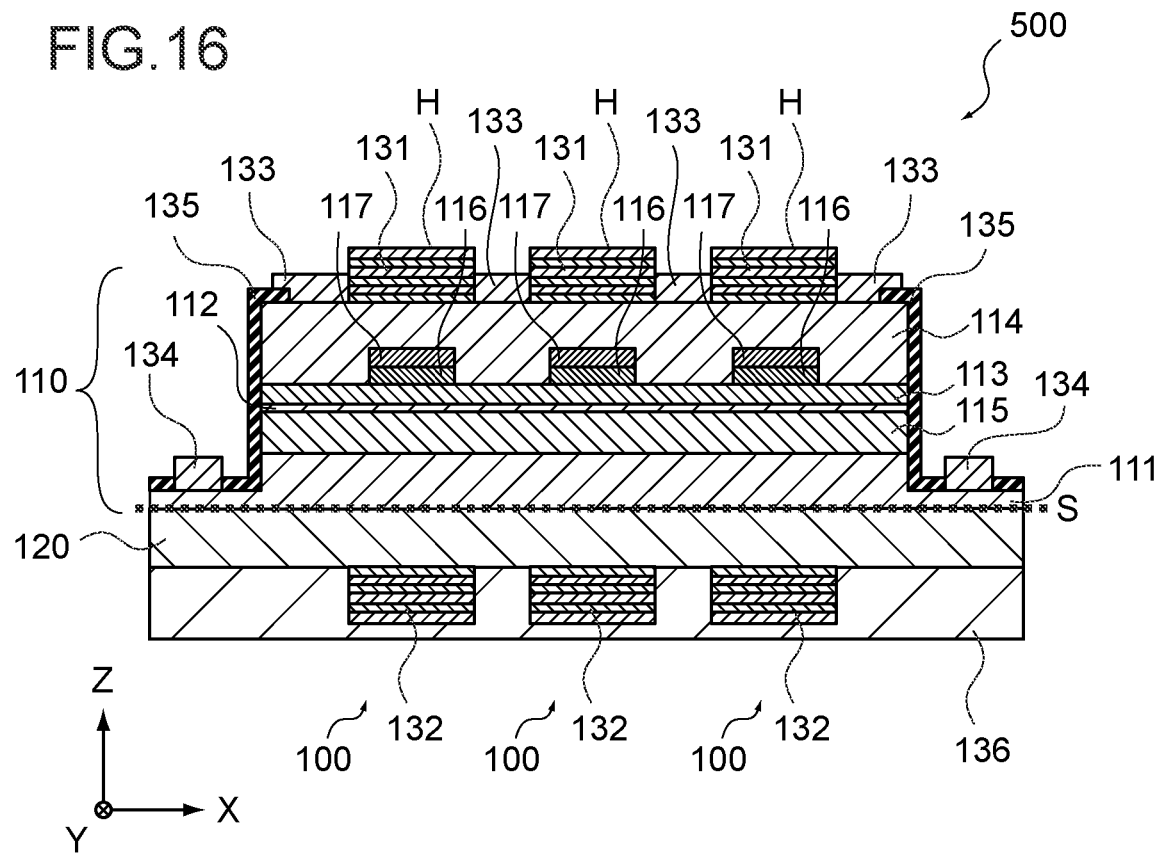
FIG. 16 is a cross-sectional view of a VCSEL element array according to a fifth embodiment of the present technology.

FIG. 16 is a cross-sectional view of a VCSEL element array 500 according to this embodiment. As shown in the figure, the VCSEL element array 500 is an array in which a plurality of VCSEL elements 100 is arranged. In FIG. 16, the VCSEL element array 500 includes three VCSEL elements 100, but the number of VCSEL elements 100 only needs to be two or more and is not limited to three.

Each of the VCSEL elements 100 has the configuration described in the first embodiment, the respective layers excluding the first tunnel junction layer 116, the second tunnel junction layer 117, the first DBR layer 131, and the second DBR layer 132 are continuous layers between the plurality of VCSEL elements 100.

The VCSEL element array 500 can be produced by forming structures corresponding to the respective VCSEL elements 100 on the first substrate 110 and the second substrate 120 and then bonding the first substrate 110 and the second substrate 120 to each other.

Also in this structure, since the second substrate 120 is provided between the first DBR layer 131 and the second DBR layer 132 in each of the VCSEL elements 100, it is possible to make each of the VCSEL elements 100 have high heat dissipation.

Modified Example

Figure 17:
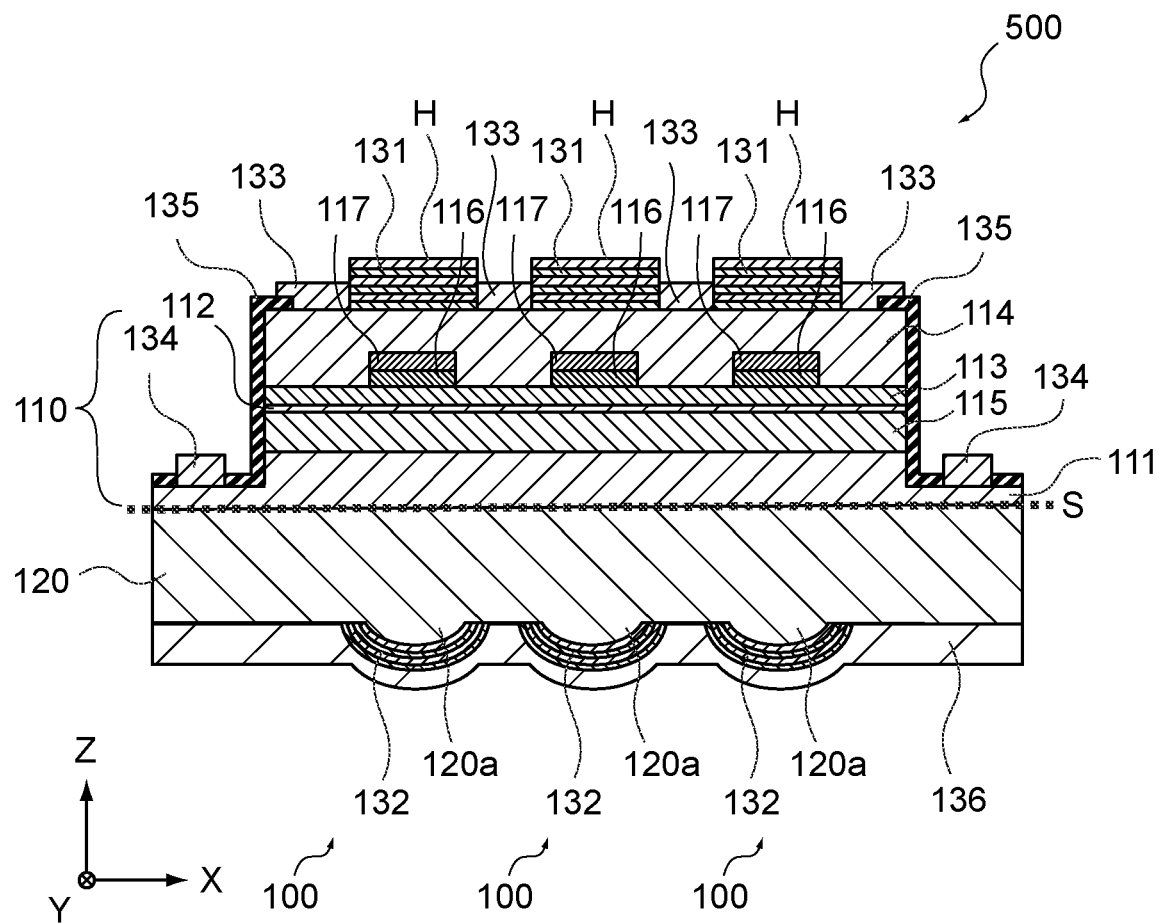
FIG. 17 is a cross-sectional view of a VCSEL element array according to a modified example of the fifth embodiment.

A modified example of the VCSEL element array 500 will be described. FIG. 17 is a cross-sectional view of the VCSEL element array 500 according to a modified example. As shown in the figure, in each of the VCSEL elements 100, the projecting portion 120a having a lens shape may be provided on the surface of the second substrate 120 opposite to the first substrate 110, and a lens structure may be formed by the second DBR layer 132 and the metal layer 136.

Further, although each of the VCSEL elements 100 has a current constriction structure by a tunnel junction also in this embodiment, the VCSEL element 100 may have a current constriction structure by oxidization according to the second embodiment or a current constriction structure by high resistance according to the third embodiment. Further, the VCSEL element array 500 may include a third substrate in addition to the second substrate 120, similarly to the fourth embodiment.

Sixth Embodiment

A VCSEL module according to a sixth embodiment of the present technology will be described.

Figure 18:
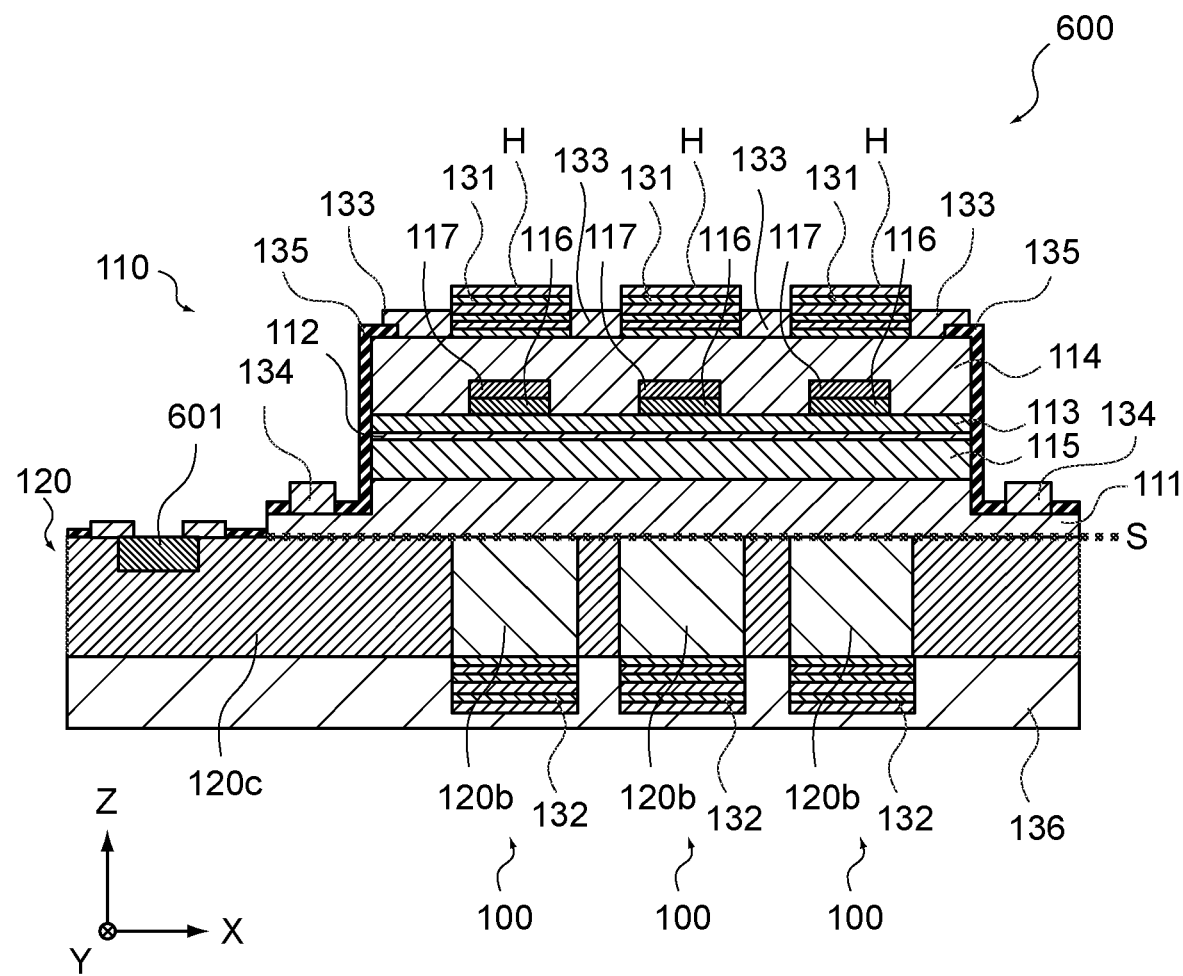
FIG. 18 is a cross-sectional view of a VCSEL module according to a sixth embodiment of the present technology.

FIG. 18 is a cross-sectional view of a VCSEL module 600 according to this embodiment. As shown in the figure, the VCSEL module 600 includes a plurality of VCSEL elements 100 and is configured such that the first substrate 110 and the second substrate 120 are bonded to each other. Although the VCSEL element 100 has the same configuration as that in the first embodiment, the second substrate 120 is a circuit substrate and includes a heat dissipation portion 120b and a circuit unit 120c. Further, the VCSEL module 600 may include only one VCSEL element 100.

The heat dissipation portion 120b is provided between the first substrate 110 and the second DBR layer 132 in each of the VCSEL elements 100. The heat dissipation portion 120b is formed of a material different from that of the first substrate 110, is configured to cause light having the emission wavelength λ of the VCSEL element 100 to be transmitted therethrough, and is formed of, for example, Si, SiC, AlN, or GaN.

The circuit unit 120c constitutes an IC (integrated circuit) in which a wiring layer and an insulation layer are laminated, for example. A photodiode 601 is provided on the second substrate 120, and the VCSEL module 600 constitutes a TOF (Time Of Flight) module that uses the VCSEL element 100 as a light-emitting element and the photodiode 601 as a light-receiving device.

The VCSEL module 600 can be prepared by bonding the first substrate 110 and the second substrate 120 to each other. The VCSEL element 100 has a high affinity with silicon photonics, and can be easily applied to a TOF module and a package.

Note that as shown in FIG. 18, in the case where the VCSEL module 600 includes a plurality of VCSEL elements 100, each of the VCSEL elements 100 can be independently drive by mounting them on the second substrate 120 that is a circuit substrate.

Modified Example

Figure 19:
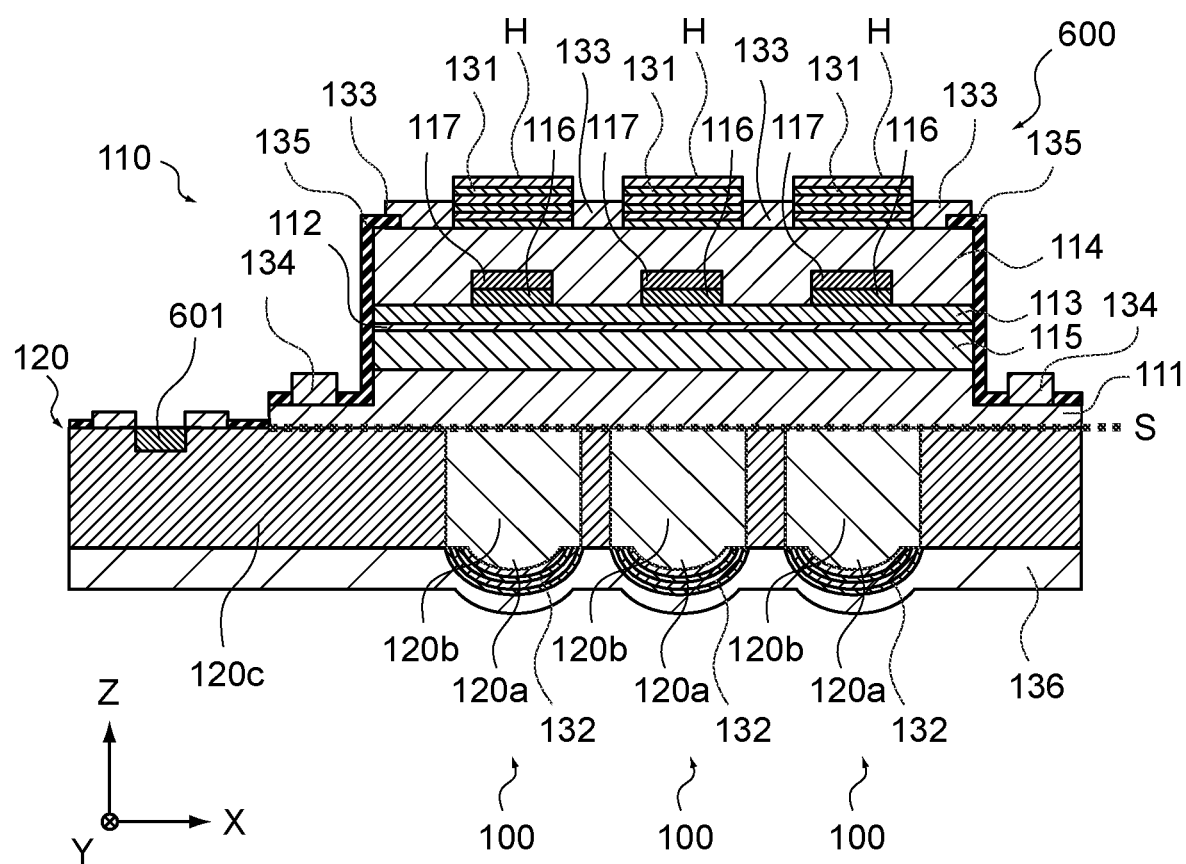
FIG. 19 is a cross-sectional view of a VCSEL module according to a modified example of the sixth embodiment.

A modified example of the VCSEL module 600 will be described. FIG. 19 is a cross-sectional view of the VCSEL module 600 according to a modified example. As shown in the figure, in each of the VCSEL elements 100, the projecting portion 120a having a lens shape is provided on the surface of the second substrate 120 opposite to the first substrate 110, and a lens structure may be formed by the second DBR layer 132 and the metal layer 136.

Further, although each of the VCSEL elements 100 has a current constriction structure by a tunnel junction in this embodiment, the VCSEL element 100 may have a current constriction structure by oxidization according to the second embodiment or a current constriction structure by high resistance according to the third embodiment. Further, the VCSEL module 600 may include a third substrate in addition to the second substrate 120, similarly to the fourth embodiment.

Note that the present technology may also take the following configurations.

(1) A vertical cavity surface emitting laser element, including:
a first substrate that is formed of a first material and includes an active layer;
a second substrate that is formed of a second material and is bonded to the first substrate, the second material causing light having a specific wavelength to be transmitted therethrough and being different from that of the first substrate;
a first distributed Bragg reflector (DBR) layer that is provided on a side of the first substrate opposite to the second substrate and reflects the light having the wavelength; and
a second DBR layer that is provided on a side of the second substrate opposite to the first substrate and reflects the light having the wavelength.

(2) The vertical cavity surface emitting laser element according to (1) above, in which
the second material is a material having thermal conductivity higher than that of the first material.

(3) The vertical cavity surface emitting laser element according to (1) or (2) above, in which
the first material is InP, and
the second material is Si, SiC, AlN, or GaN.

(4) The vertical cavity surface emitting laser element according to (3) above, in which
the first substrate includes the active layer formed by crystal growth on a base material formed of InP.

(5) The vertical cavity surface emitting laser element according to (1) or (2) above, in which
the first material is GaAs, and
the second material is Si, SiC, AlN, or GaN.

(6) The vertical cavity surface emitting laser element according to (5) above, in which
the first substrate includes the active layer formed by crystal growth on a base material formed of GaAs.
(7) The vertical cavity surface emitting laser element according to any one of (1) to (6) above, which has a current constriction structure by a tunnel junction.
(8) The vertical cavity surface emitting laser element according to (7) above, which has a light constriction structure by the tunnel junction.
(9) The vertical cavity surface emitting laser element according to any one of (1) to (6) above, which has a current constriction structure by oxidation treatment.
(10) The vertical cavity surface emitting laser element according to any one of (1) to (6) above, which has a current constriction structure by ion implantation.
(11) The vertical cavity surface emitting laser element according to any one of (1) to (10) above, which has a lens structure that
is formed by a projecting portion provided on the second substrate and the second DBR layer provided on the projecting portion, and
collects incident light on a region of the active layer between the first DBR layer and the second DBR layer.
(12) The vertical cavity surface emitting laser element according to any one of (1) to (11) above, further including
a third substrate that is formed of a third material and is bonded a side of the first substrate opposite to the second substrate, the third material causing light having the wavelength to be transmitted therethrough and being different from that of the first substate, in which
the first DBR layer is provided on a side of the third substrate opposite to the first substrate.
(13) The vertical cavity surface emitting laser element according to any one of (1) to (12) above, in which
the first DBR layer is a semiconductor DBR or a dielectric DBR, and
the second DBR layer is a semiconductor DBR or a dielectric DBR.
(14) The vertical cavity surface emitting laser element according to any one of (1) to (13) above, which emits a laser beam from a side of the second DBR layer.
(15) The vertical cavity surface emitting laser element according to any one of (1) to (13) above, which emits a laser beam from a side of the first DBR layer.
(16) A vertical cavity surface emitting laser element array, including:
a plurality of arranged vertical cavity surface emitting laser elements each including a first substrate that is formed of a first material and includes an active layer, a second substrate that is formed of a second material and is bonded to the first substrate, the second material causing light having a specific wavelength to be transmitted therethrough and being different from that of the first substrate, a first distributed Bragg reflector (DBR) layer that is provided on a side of the first substrate opposite to the second substrate and reflects the light having the wavelength, and a second DBR layer that is provided on a side of the second substrate opposite to the first substrate and reflects the light having the wavelength.
(17) A vertical cavity surface emitting laser module, including:
a vertical cavity surface emitting laser element that includes a first substrate that is formed of a first material and includes an active layer, a second substrate that is formed of a second material and is bonded to the first substrate, the second material causing light having a specific wavelength to be transmitted therethrough and being different from that of the first substrate, a first distributed Bragg reflector (DBR) layer that is provided on a side of the first substrate opposite to the second substrate and reflects the light having the wavelength, and a second DBR layer that is provided on a side of the second substrate opposite to the first substrate and reflects the light having the wavelength, in which
the second substrate is a circuit substrate.
(18) A method of producing a vertical cavity surface emitting laser element array, including:
forming a first substrate that is formed of a first material and includes an active layer;
Forming a second substrate that is formed of a second material, the second material causing light having a specific wavelength to be transmitted therethrough and being different from that of the first substrate; and
bonding the first substrate and the second substrate to each other to form a structure in which the first substrate and the second substrate are located between a first distributed Bragg reflector (DBR) layer that reflects the light having the wavelength and a second DBR layer that reflects the light having the wavelength.

REFERENCE SIGNS LIST

100, 200, 300, 400 VCSEL element
110, 210, 310, 410 first substrate
120, 220, 320, 420 second substrate
430 third substrate
131, 231, 331, 431 first DBR layer
132, 232, 332, 432 second DBR layer
115, 215, 315, 415 active layer
500 VCSEL element array
600 VCSEL module

The invention claimed is:
1. A vertical cavity surface emitting laser element, comprising:
a first substrate that includes a first material and an active layer;
a second substrate that includes a second material, wherein
the second substrate is bonded to the first substrate,
light having a specific wavelength is transmittable through the second material, and
the second material is different from the first material;
a first distributed Bragg reflector (DBR) layer on a side of the first substrate opposite to the second substrate,
wherein the first DBR layer is configured to reflect the light having the specific wavelength;
a second DBR layer on a side of the second substrate opposite to the first substrate,
wherein the second DBR layer is configured to reflect the light having the specific wavelength; and
a third substrate on the side of the first substrate opposite to the second substrate, wherein
the first DBR layer is on a side of the third substrate opposite to the first substrate, and
the third substrate includes a third material having a thermal conductivity higher than that of the first material.
2. The vertical cavity surface emitting laser element according to claim 1, wherein the second material has a thermal conductivity higher than that of the first material.

3. The vertical cavity surface emitting laser element according to claim 1, wherein
the first material includes InP, and
the second material includes one of Si, SiC, AlN, or GaN.

4. The vertical cavity surface emitting laser element according to claim 3, wherein
the first substrate further includes a semiconductor layer including InP, and
the active layer is on the semiconductor layer.

5. The vertical cavity surface emitting laser element according to claim 1, wherein
the first material includes GaAs, and
the second material includes one of Si, SiC, AlN, or GaN.

6. The vertical cavity surface emitting laser element according to claim 5, wherein the active layer includes GaAs.

7. The vertical cavity surface emitting laser element according to claim 1, further comprising a current constriction structure that includes a plurality of tunnel junction layers.

8. The vertical cavity surface emitting laser element according to claim 1, further comprising a light constriction structure that includes a plurality of tunnel junction layers.

9. The vertical cavity surface emitting laser element according to claim 1, further comprising a current constriction structure that includes a constriction layer, wherein the constriction layer includes an oxidized semiconductor material.

10. The vertical cavity surface emitting laser element according to claim 1, further comprising a current constriction structure that includes a first region and a second region, wherein the first region has a higher resistance than the second region based on ion implantation on the first region.

11. The vertical cavity surface emitting laser element according to claim 1, further comprising a lens structure that includes a projecting portion on the second substrate, wherein
the second DBR layer is on the projecting portion, and
the lens structure is configured to collect incident light on a region of the active layer between the first DBR layer and the second DBR layer.

12. The vertical cavity surface emitting laser element according to claim 1, wherein the light having the specific wavelength is transmittable through the third material.

13. The vertical cavity surface emitting laser element according to claim 1, wherein
the first DBR layer is one of a first semiconductor DBR or a first dielectric DBR, and
the second DBR layer is one of a second semiconductor DBR or a second dielectric DBR.

14. The vertical cavity surface emitting laser element according to claim 1, wherein the vertical cavity surface emitting laser element is configured to emit a laser beam from a side of the second DBR layer.

15. The vertical cavity surface emitting laser element according to claim 1, wherein the vertical cavity surface emitting laser element is configured to emit a laser beam from a side of the first DBR layer.

16. A vertical cavity surface emitting laser element array, comprising:
a plurality of arranged vertical cavity surface emitting laser elements, wherein each of the plurality of arranged vertical cavity surface emitting laser elements includes:
a first substrate that includes a first material and an active layer;
a second substrate that includes a second material, wherein
the second substrate is bonded to the first substrate,
light having a specific wavelength is transmittable through the second material, and
the second material is different from that of the first material;
a first distributed Bragg reflector (DBR) layer on a side of the first substrate opposite to the second substrate, wherein the first DBR layer is configured to reflect the light having the specific wavelength;
a second DBR layer on a side of the second substrate opposite to the first substrate, wherein the second DBR layer is configured to reflect the light having the specific wavelength; and
a third substrate on the side of the first substrate opposite to the second substrate, wherein
the first DBR layer is on a side of the third substrate opposite to the first substrate, and
the third substrate includes a third material having a thermal conductivity higher than that of the first material.

17. A vertical cavity surface emitting laser module, comprising:
a vertical cavity surface emitting laser element that includes:
a first substrate that includes a first material and an active layer;
a second substrate that includes a second material, wherein
the second substrate is bonded to the first substrate,
light having a specific wavelength is transmittable through the second material, and
the second material is different from the first material;
a first distributed Bragg reflector (DBR) layer on a side of the first substrate opposite to the second substrate, wherein the first DBR layer is configured to reflect the light having the specific wavelength;
a second DBR layer on a side of the second substrate opposite to the first substrate, wherein
the second DBR layer is configured to reflect the light having the specific wavelength, and
the second substrate is a circuit substrate; and
a third substrate on the side of the first substrate opposite to the second substrate, wherein
the first DBR layer is on a side of the third substrate opposite to the first substrate, and
the third substrate includes a third material having a thermal conductivity higher than that of the first material.

18. A method of producing a vertical cavity surface emitting laser element array, the method comprising:
forming a first substrate that includes a first material and an active layer;
forming a second substrate that includes a second material, wherein
light having a specific wavelength is transmittable through the second material, and
the second material is different from the first material;
bonding the first substrate to the second substrate to form a structure in which the first substrate and the second substrate are located between a first distributed Bragg reflector (DBR) layer that reflects the light having the specific wavelength and a second DBR layer that reflects the light having the specific wavelength; and forming a third substrate on a side of the first substrate opposite to the second substrate, wherein
the first DBR layer is on a side of the third substrate opposite to the first substrate, and
the third substrate includes a third material having a thermal conductivity higher than that of the first material.

* * * * *